(12) United States Patent
Ikuta

(10) Patent No.: US 6,204,993 B1
(45) Date of Patent: Mar. 20, 2001

(54) REEL DRIVE MECHANISM FOR A CASSETTE TAPE PLAYER

(76) Inventor: Tadahiro Ikuta, 1276-2, Midori, Nishinasuno-cho, Nasa-gun, Tochigi (JP)

( * ) Notice: Subject to any disclaimer, the term of this patent is extended or adjusted under 35 U.S.C. 154(b) by 0 days.

(21) Appl. No.: 09/141,744

(22) Filed: Aug. 27, 1998

(30) Foreign Application Priority Data

Sep. 1, 1997 (JP) .................................. 9-235893

(51) Int. Cl.$^7$ ................................................. G11B 15/28
(52) U.S. Cl. ........................................................ 360/96.3
(58) Field of Search ............................. 360/96.2, 96.3, 360/96.5; 242/356, 356.3, 356.5, 356.7

(56) References Cited

U.S. PATENT DOCUMENTS

| | | | |
|---|---|---|---|
| 4,170,059 | * 10/1979 | Kahn | 360/96.1 |
| 4,499,783 | * 2/1985 | Takemasa | 74/411 |
| 4,577,245 | * 3/1986 | Nemoto et al. | 360/93 |
| 4,999,723 | * 3/1991 | Yamanaka | 360/966.5 |
| 5,062,014 | * 10/1991 | Yoshimura | 360/96.2 |
| 5,063,455 | * 11/1991 | Yoshimura | 360/96.5 |
| 5,251,845 | * 10/1993 | Ryu | 242/356.3 |
| 5,260,844 | * 11/1993 | Koga et al. | 360/96.3 |
| 5,355,264 | * 10/1994 | Nagatsuka et al. | 360/85 |
| 5,833,163 | * 11/1998 | Lee | 242/356.5 |

FOREIGN PATENT DOCUMENTS

| | | |
|---|---|---|
| 09141744 | * 12/1984 | (JP) . |
| 4-184752 | * 7/1992 | (JP) . |
| 5-131747 | * 5/1994 | (JP) . |
| 6-176458 | * 6/1994 | (JP) . |

* cited by examiner

Primary Examiner—Brian E. Miller

(57) ABSTRACT

To reduce the number of parts and simplify the structure by permitting the forward-rotation components and the reverse-rotation components to share a mechanism of transmitting the driving force to a pair of reel blocks 42F,42R. A pair of capstans 41F,41R respectively serving for forward rotation and reverse rotation and a pair of reel blocks 42F,42R respectively serving for forward rotation and reverse rotation are provided. One of the capstans, i. e. the capstan 41F, is provided with a low-speed gear 48, while the other capstan 41R is provided with a high-speed gear 49. The reel blocks 42F,42R are respectively provided with reel gears 50F,50R. A transmission changeover means 51 is installed to transmit the driving force from the low-speed gear 48 to the appropriate gear selected between the reel gears 50F,50R according to the direction in which the tape is run when the system is in either the forward mode or the reverse mode, and transmit the driving force from the high-speed gear 49 to the appropriate gear selected between the reel gears 50F,50R according to the direction of rotation of the tape when the system is in either the fast-forward mode or the rewinding mode.

39 Claims, 20 Drawing Sheets

REEL DRIVE MECHANISM FOR A CASSETTE TAPE PLAYER

BACKGROUND OF THE INVENTION

The present invention relates to a cassette tape player which is capable of playing, fast-forwarding and rewinding of the tape of a cassette tape in both the forward and reverse directions.

Conventionally known cassette tape players include those of the auto reverse type adapted to run, fast-forward and fast-rewind the tape of a cassette tape in both the forward and reverse directions. An example of cassette tape players of this type is disclosed in Japanese Patent Laid-open No. 1994-176458.

A cassette tape player of the auto-reverse type mentioned above includes a pair of capstans which respectively serve for forward rotation and reverse rotation, a pair of pinch rollers for pushing a tape against the capstans, and a pair of reel blocks to rotate the pair of reels of a cassette tape in the direction in which the tape is to be taken up, said reel blocks respectively associated with forward rotation and reverse rotation. With the components as above, when the device is in either the forward mode or the reverse mode, the capstan and the pinch roller corresponding to the direction of the current mode run the tape at a constant speed, while the reel corresponding to the direction of the current mode is rotated at a low speed to take up the tape. When the device is in either the fast-forward mode or the rewinding mode, the tape is fast-forwarded or fast-rewound by rotating the reel corresponding to the direction of the current mode at a high speed.

The forward capstan and the reverse capstan are designed to be rotated at a constant speed in the directions respectively corresponding thereto by fly wheels fastened to the capstans, and the rotation of the fly wheels is transmitted to the forward reel block and the reverse reel block through transmission mechanisms which are respectively and individually installed on the forward-rotation side and the reverse-rotation side so that the reel blocks are rotated at a low speed or a high speed.

Each transmission mechanism on the forward-rotation side and the reverse-rotation side includes a low-speed gear having a small diameter and a high-speed gear having a large diameter, both of which are attached to the corresponding fly wheel; a reel gear associated with the reel block; a low-speed intermediate gear for transmitting the driving force from the low-speed gear to the reel block associated therewith; a high-speed intermediate gear for transmitting the driving force from the high-speed gear to the reel block; a mechanism for engaging or removing the low-speed intermediate gear with or from the reel gear; and a mechanism for engaging or removing the high-speed intermediate gear with or from the reel gear.

SUMMARY OF THE INVENTION

However, the structure of the conventional cassette tape player described above is complicated and requires a large number of parts, because the forward-rotation side and the reverse-rotation side are provided individually with transmission means to respectively rotate the forward reel block and the reverse reel block.

In order to solve the above problems, an object of the present invention is to provide a cassette tape player having a simple structure with a reduced number of parts, wherein a mechanism of transmitting the driving force to a pair of reel blocks is shared by the forward-rotation components and the reverse-rotation components.

A cassette tape player according to the invention includes a pair of capstans which are respectively serve for forward rotation and reverse rotation, a driving means for driving said capstans in the directions respectively corresponding thereto, i. e. forward and in reverse, a pair of reel blocks which respectively serve for forward rotation and reverse rotation, a pair of reel gears to be integrally rotated with the reel blocks, a low-speed gear to be integrally rotated with one of the capstans, a high-speed gear to be integrally rotated with the other capstan, and a transmission changeover means for transmitting the driving force from the low-speed gear to the reel gear that corresponds to the direction in which the tape is desired to run when the system is in either the forward mode or the reverse mode, and transmitting the driving force from the high-speed gear to the reel gear that corresponds to the direction in which the tape is fed when the system is in either the fast-forward mode or the rewinding mode.

In the course of a forward operation, the transmission changeover means transmits the driving force from the low-speed gear to the reel gear for forward rotation. In the course of a reverse operation, the transmission changeover means transmits the driving force from the low-speed gear to the reel gear for reverse rotation. During a fast-forward operation, the transmission changeover means transmits the driving force from the high-speed gear to the reel gear serving for forward rotation. During a rewinding operation, the transmission changeover means transmits the driving force from the high-speed gear to the reel gear serving for reverse rotation. The mechanism of transmitting the driving force to the pair of reel blocks is thus shared by the forward-rotation components and the reverse-rotation components.

The transmission changeover means is disposed between the pair of capstans and the pair of reel blocks and includes a pair of interlocked transmission gears, a gear supporting plate supporting the transmission gears in such a manner as to permit the transmission gears to rotate, a first rocking plate for rocking the gear supporting plate in the direction of the capstan and the reel block serving for forward rotation or in the direction of the capstan and the reel block serving for reverse rotation, and a second rocking plate for rocking the gear supporting plate back and forth between the capstans and the reel blocks.

By thus rocking the two transmission gears disposed between the pair of capstans and the pair of reel blocks back and forth toward either the forward-rotation side or the reverse-rotation side, and toward either the capstans or the reel blocks respectively, transmission changeover can be performed easily and reliably.

The cassette tape player includes an end detecting means which is provided with a rotation detecting sensor for detecting rotation of one of the transmission gears and is adapted to detect the tape end based on detection by the rotation detecting sensor of rotation of said transmission gear coming to a stop.

By monitoring rotation of the transmission gear and detecting the tape end based on detection by the rotation detecting sensor of rotation of said transmission gear coming to a stop, an end detecting means that shares a transmission gear with the transmission changeover means is provided without the need of providing each reel block with an end detecting means or separately installing a dedicated detecting mechanism.

The cassette tape player further includes a pair of fly wheels to be respectively rotated together with the capstans, a low-speed clutch which is installed between one of the fly wheels and the low-speed gear and is adapted to transmit torque from said fly wheel to the low-speed gear and stop transmission in the event where the torque exceeds a given level, and a high-speed clutch which is installed between the other fly wheel and the high-speed gear to transmit torque from the fly wheel associated therewith to the high-speed gear and stop transmission in the event where the torque exceeds a given level.

As a low-speed clutch is installed between one of the fly wheels and the low-speed gear, while a high-speed clutch is installed between the other fly wheel and the high-speed gear, it is easy to set respective torques appropriate for a low speed and a high speed.

The cassette tape player further includes a mode changeover plate which enables the control of the transmission changeover function of the transmission changeover means and is adapted to be shifted to any one of the positions selected from among the forward-mode position to permit the driving force to be transmitted from the low-speed gear to the forward reel gear, the reverse-mode position to permit the driving force to be transmitted from the low-speed gear to the reverse reel gear, the fast-forward-mode position to permit the driving force to be transmitted from the high-speed gear to the forward reel gear and the rewinding-mode position to permit the driving force to be transmitted from the high-speed gear to the reverse reel gear.

Therefore, any mode can be selected and performed from among the forward mode, the reverse mode, the fast-forward mode and the rewinding mode by shifting a single unit of a mode changeover plate.

The cassette tape player further includes a head plate which supports the head and is adapted to move the head toward a cassette tape as a result of shifting of the mode changeover plate to the forward-mode position or the reverse-mode position, and also move the head away from a cassette tape as a result of shifting of the mode changeover plate to the fast-forward-mode position or the rewinding-mode position.

Thus, by shifting a single unit of a mode changeover plate, the head can be moved toward or away from a cassette tape according to the current mode.

The cassette tape player further includes a pair of pinch rollers adapted to be brought into contact with and separated from the pair of capstans respectively, and a pinch roller changeover means adapted to move the forward pinch roller toward the corresponding capstan upon shifting of the mode changeover plate to the forward-mode position, move the reverse pinch roller toward the corresponding capstan upon shifting of the mode changeover plate to the reverse-mode position, and move both pinch rollers away from the capstans as a result of shifting of the mode changeover plate to the fast-forward-mode position or the rewinding-mode position.

Thus, by shifting a single unit of a mode changeover plate, the pinch roller or pinch rollers can be brought into contact with or separated from the capstans according to each respective mode.

The cassette tape player further includes a loading mechanism for loading or ejecting a cassette tape on or from a given cassette loading area of the cassette tape player, a drive gear adapted to be rotated when the loading mechanism performs its loading function or ejecting function, a loading rack which is a part of the loading mechanism and adapted to be engaged with the drive gear so as to enable the loading mechanism to perform its loading function or ejecting function, a mode changeover rack which is a part of said mode changeover plate and adapted to be moved in parallel with the loading rack and engaged with the drive gear so as to enable the shifting of the mode changeover plate, and an interlocking timing adjusting means for locking either the loading rack or the mode changeover rack at a position separated from the drive gear when the other member, i.e. the loading rack or the mode changeover rack, becomes engaged with the drive gear, engaging the mode changeover rack with the drive gear when the loading rack becomes disengaged from the drive gear during a loading operation, and engaging the loading rack with the drive gear when the mode changeover rack becomes disengaged from the drive gear during an ejecting operation.

With the configuration as above, the loading mechanism is capable of performing the loading function and the ejecting function thereof by means of the loading rack that is adapted to be engaged with the drive gear, and the mode changeover plate can be shifted by means of the mode changeover rack that is adapted to be engaged with the drive gear, said loading mechanism and the mode changeover plate designed to be driven by a single driving source that drives the drive gear. Furthermore, the interlocking timing adjusting means permits either the loading rack or the mode changeover rack to be locked at a position separated from the drive gear when the other member, i.e. the loading rack or the mode changeover rack, becomes engaged with the drive gear. The interlocking timing adjusting means also brings the mode changeover rack into engagement with the drive gear when the loading rack becomes disengaged from the drive gear during a loading operation, and brings the loading rack into engagement with the drive gear when the mode changeover rack becomes disengaged from the drive gear during an ejecting operation. Thus, reliable engagement of the loading rack with the drive gear as well as reliable engagement of or the mode changeover rack with the drive gear are ensured.

The positions to which the mode changeover plate may be shifted include a stand-by position to transmit the driving force from the low-speed gear to the reel gear associated with one of the reel blocks, and the cassette tape player further includes a reel block stopper for stopping the other reel block as a result of shifting the mode changeover plate to the stand-by position, and a tape slack eliminating control means for rotating said one reel block by means of the driving means when the mode changeover plate is shifted to the stand-by position.

By stopping one of the reel blocks when the mode changeover plate is shifted to the stand-by position and rotating the other reel block through control by the tape slack eliminating control means, the present invention eliminates a slack of the tape and thereby preventing the tape from tangling or other similar problems.

The above, and other objects, features and advantages of the present invention will become apparent from the following description read in conjunction with the accompanying drawings, in which like reference numerals designate the same elements.

DETAILED DESCRIPTION OF THE PREFFERED EMBODIMENT

Figure 1:
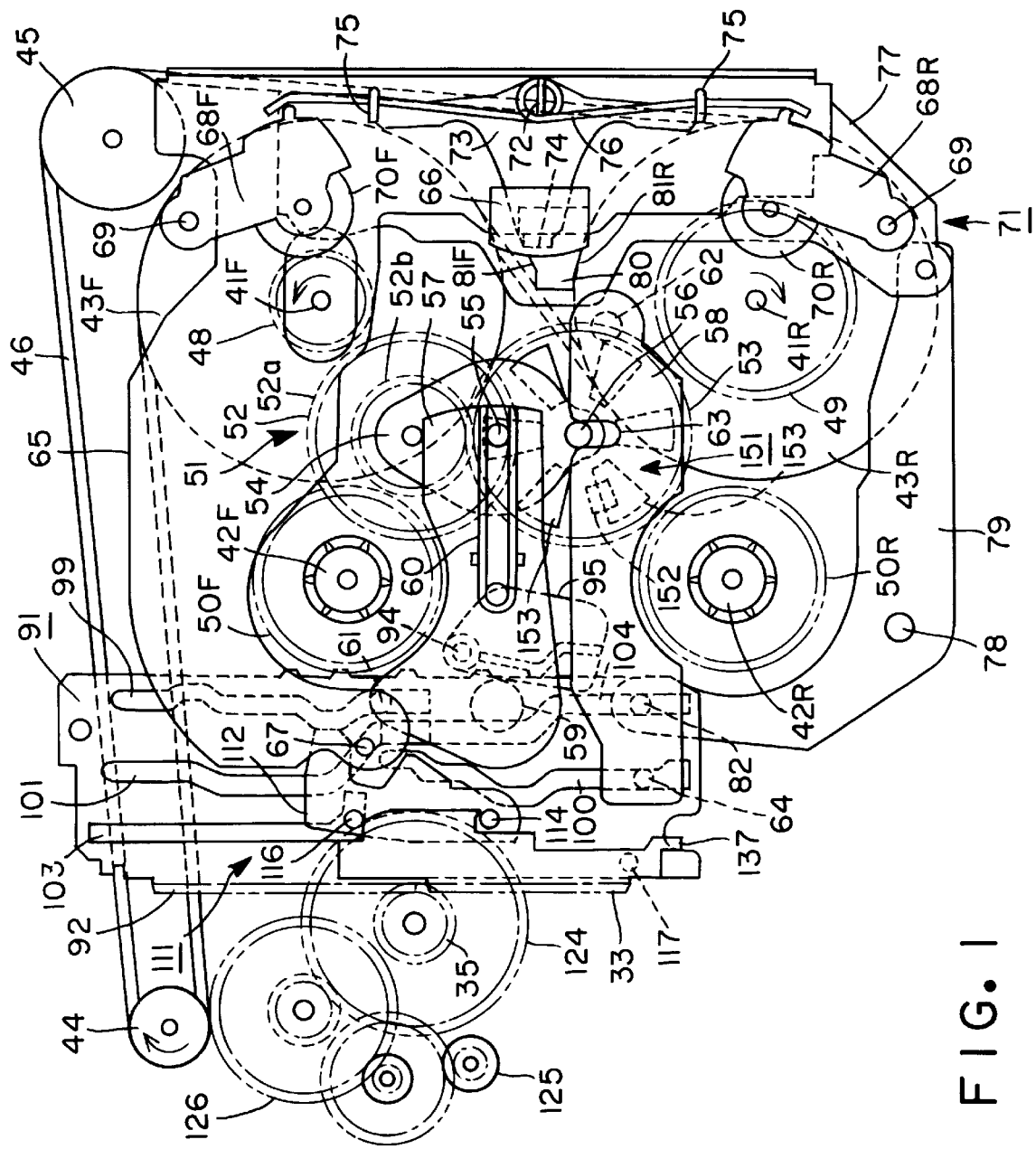
FIG. 1 is a schematic plan view of a cassette tape player according to the first embodiment of the present invention in the stand-by mode.

Next, an embodiment of the present invention is explained hereunder, referring to the drawings.

FIGS. 1 through 18 show a first embodiment.

Figure 6:
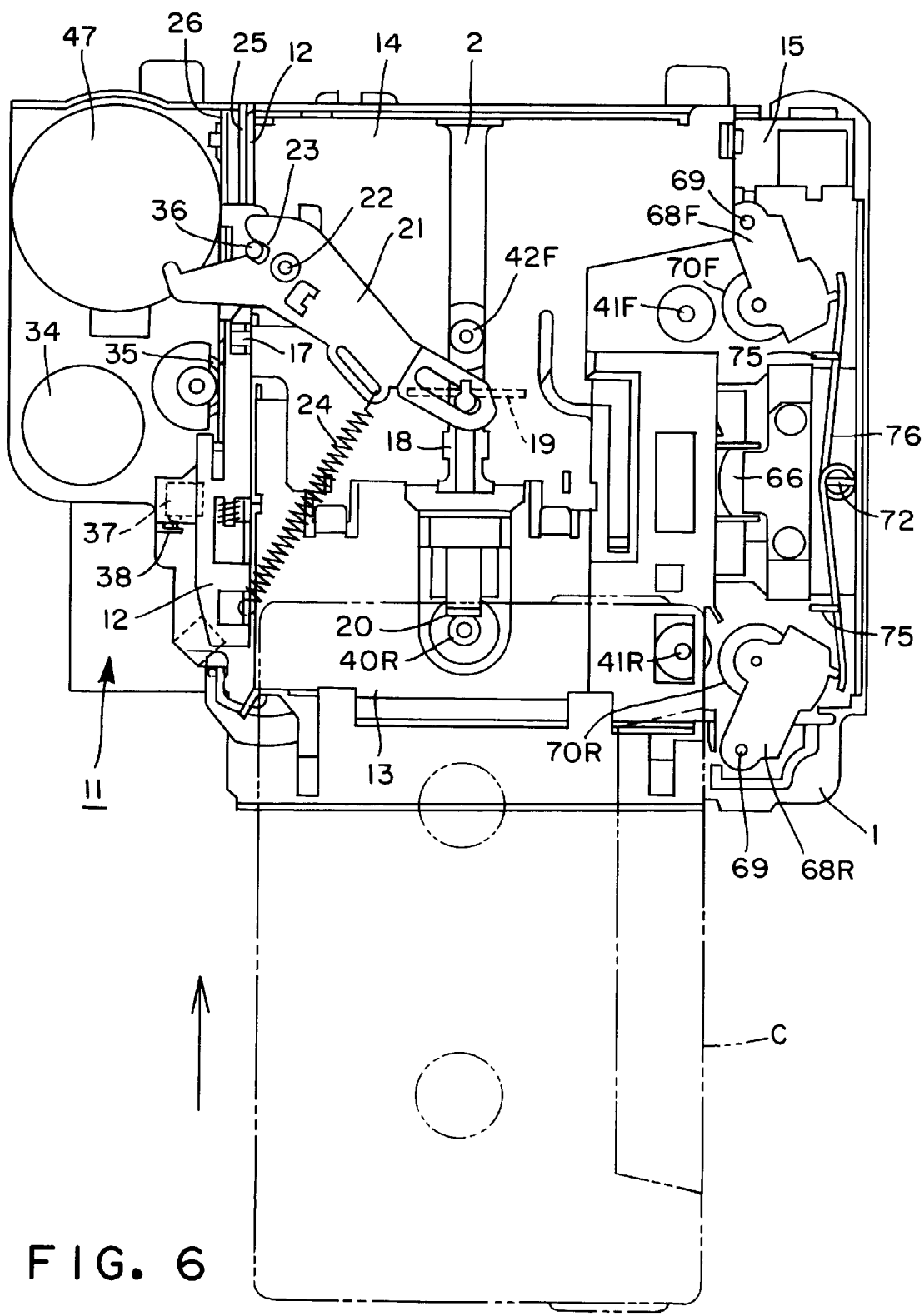
FIG. 6 is a schematic plan view of a cassette tape player before a cassette tape is loaded, i. e. in the state where a cassette tape is ejected.
Figure 7:
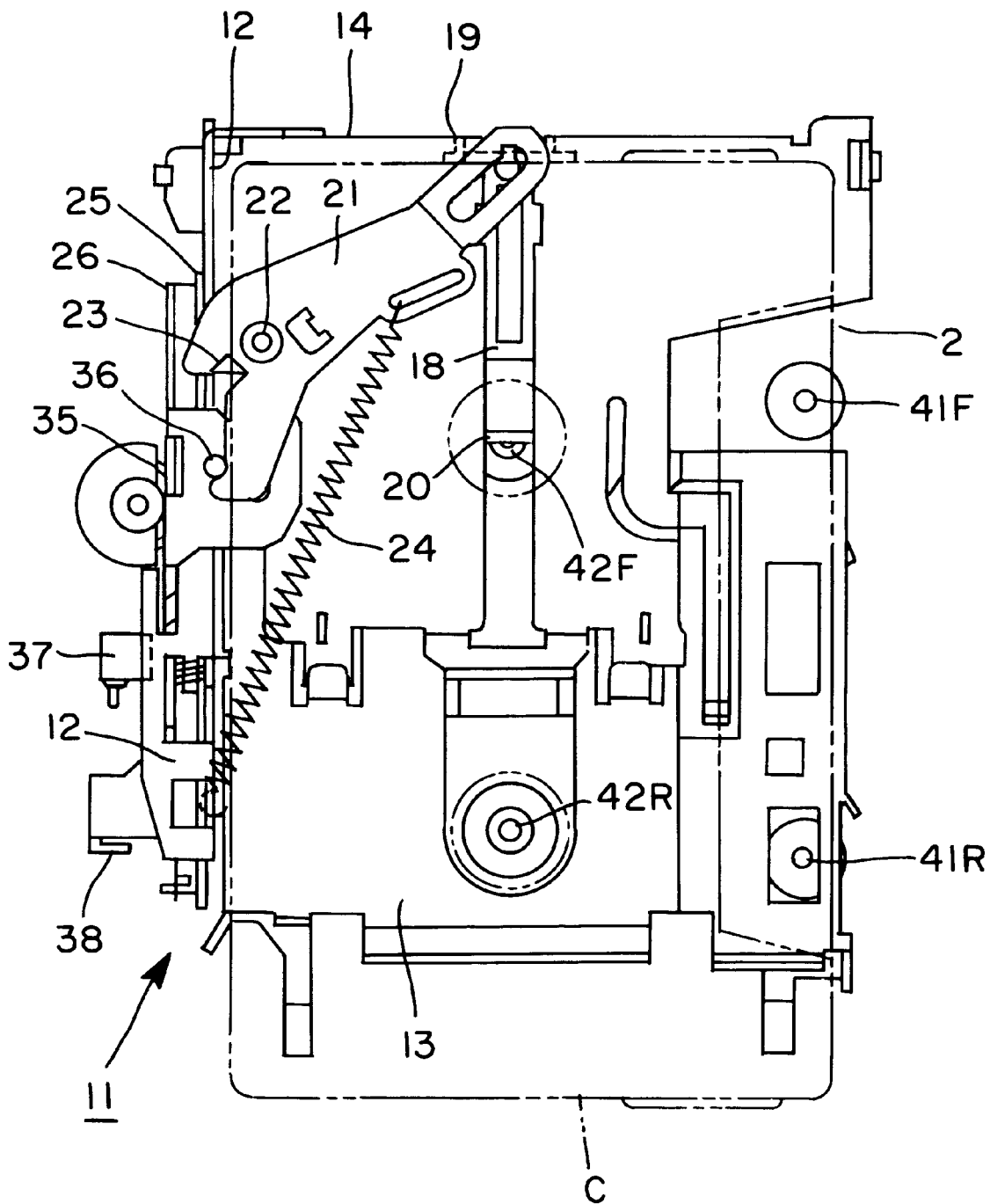
FIG. 7 is a schematic plan view of the cassette tape player loaded with a cassette tape.
Figure 8:
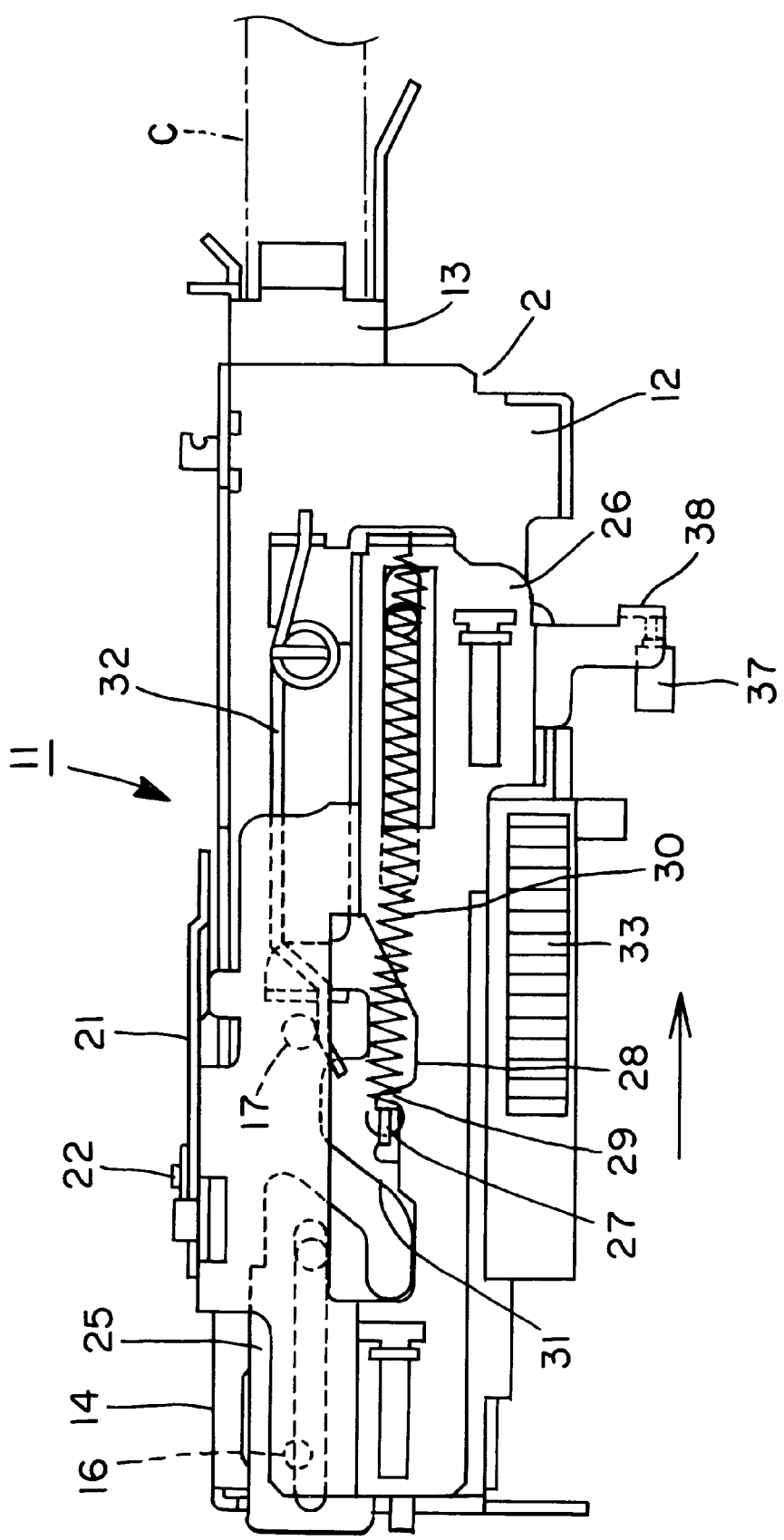
FIG. 8 is a left side view of the cassette tape player before a cassette tape is loaded, i.e. in the state where a cassette tape is ejected.
Figure 9:
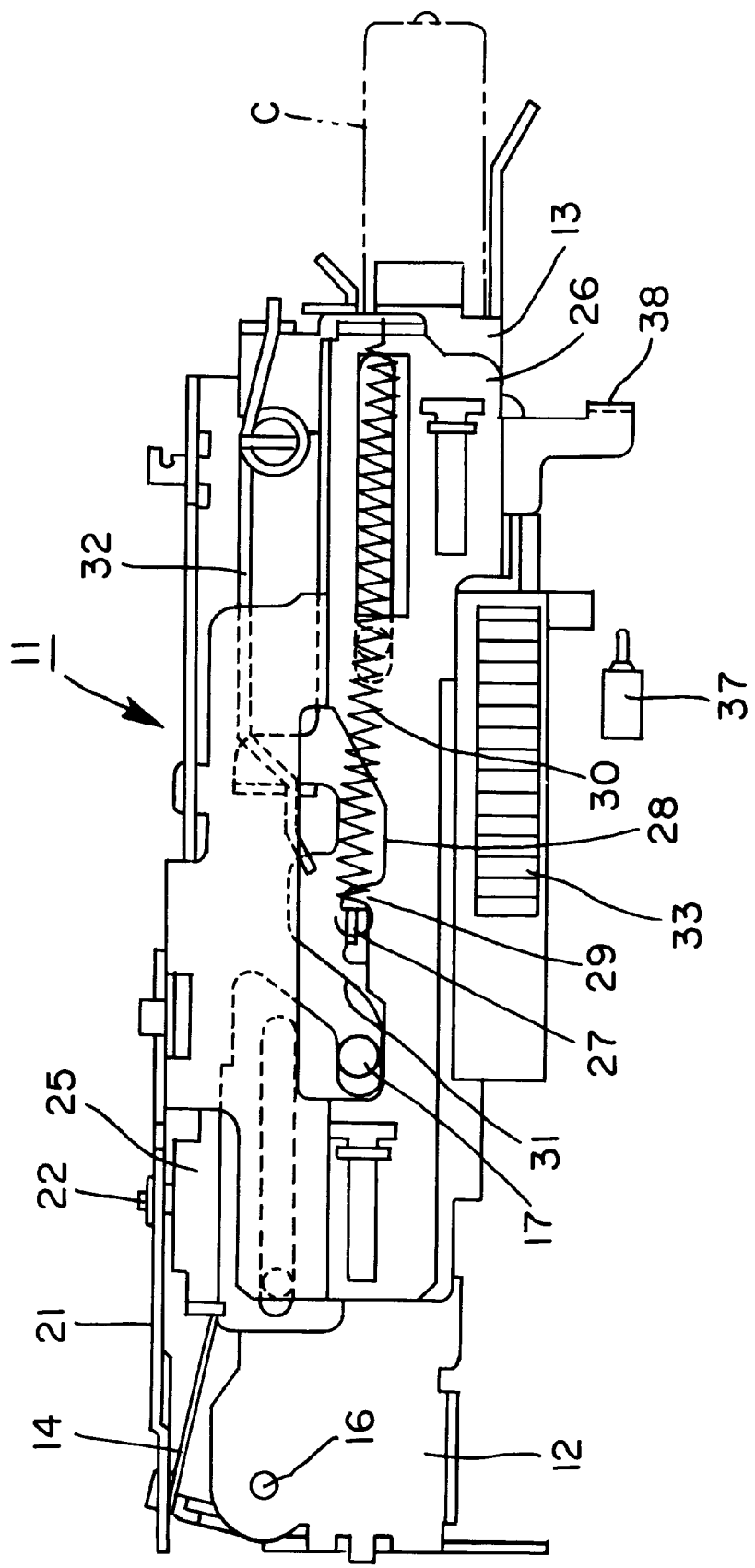
FIG. 9 is a left side view of the cassette tape player before a cassette tape is loaded.

FIG. 6 is a schematic plan view of a cassette tape player before a cassette tape is loaded, i. e. in the state where a cassette tape is ejected; FIG. 7 is a schematic plan view of the cassette tape player loaded with a cassette tape; FIG. 8 is a left side view of the cassette tape player before a cassette tape is loaded, i. e. in the state where a cassette tape is ejected; FIG. 9 is a left side view of the cassette tape player before a cassette tape is loaded.

In the drawings, numeral 1 denotes a base plate. A cassette loading area 2 on which a cassette tape C will be loaded is formed at the approximate center of the upper side of the base plate 1.

Disposed on the base plate 1 is a loading mechanism 11 for loading a cassette tape C from the front, in other words from underneath as viewed in FIGS. 6 and 7 and from the right side as viewed in FIGS. 8 and 9, into the cassette loading area 2 and ejecting the cassette tape forward from the cassette loading area 2.

The loading mechanism 11 includes a side bracket 12 rising from the base plate 1 and extending in the fore-and-aft direction, and a cassette holder 13 for receiving and holding the cassette tape C, and a rocking plate 14 for supporting and vertically moving the cassette holder 13, the side bracket 12 located on the of the cassette loading area 2, and the cassette holder 13 and the rocking plate 14 located at the right of the side bracket 12, i. e. above the cassette loading area 2.

The cassette holder 13 is adapted to receive the cassette tape C moved in the fore-and-aft direction and hold the cassette tape C at a specified position by restraining it at the top and bottom and both lateral sides. The rocking plate 14 is supported at both sides of its back end by the side bracket 12 and a support member 15 that stands on the base plate 1 so that the rocking plate 14 can be rocked around a shaft portion 16 that is laid across the side bracket 12 and the support member 15. The cassette holder 13 is rockably connected to the front end of the rocking plate 14 so that a rocking motion of the rocking plate 14 may vertically move the cassette holder 13 between an ejecting position at the top and a loading position at the bottom in the state where the cassette holder 13 is held virtually horizontally. A pin 17 is formed on the left side of the rocking plate 14 and protrude therefrom so as to be inserted through the side bracket 12 and engaged with a cam plate 25 that is described later.

A cassette catcher 18 is attached to the center of the rocking plate 14 in such a manner as to be free to slide forward and rearward. An abutting portion 19 adapted to come into contact with the end face of a cassette tape C as the cassette tape is inserted into the cassette holder 13 is formed at the rear end of the cassette catcher 18, and a tooth portion 20 which is capable of hooking in a reel hole of the cassette tape C is formed on the front end of the cassette catcher 18.

A load arm 21 is supported at the middle portion thereof on the side bracket 12 by means of a shaft portion 22 provided near the rear end of the side bracket 12 in such a manner that the load arm 21 is capable of rotating around the shaft portion 22. An end of the load arm 21 is joined to the rear end of the cassette catcher 18. A cam groove 23 adapted to engage with a pin 36 of a switch plate 26 (to be described later) is formed at the other end of the cassette catcher 18. Stretched between said one end of the load arm 21 and the front end of the side bracket 12 is a spring 24 that serves to apply a force to the load arm 21 in such a direction as to rotate clockwise as viewed in FIGS. 6 and 7.

The cam plate 25 is located at the left of the side bracket 12 in such a manner as to be capable of sliding forward and rearward. The switch plate 26 is located at the left of the cam plate 25 in such a manner as to be capable of sliding forward and rearward.

A protrusion 27 protruding to the left is formed on the approximate center of the cam plate 25. An aperture 28 adapted to permit the protrusion 27 to be inserted therethrough is formed about the middle of the switch plate 26, and a stopper portion 29 with which the front end of the protrusion 27 is arranged to come into contact is formed at the edge of the aperture 28. A spring 30 for applying constant force to the cam plate 25 and the switch plate 26 in such a direction as to bring the protrusion 27 into contact with the stopper portion 29 is stretched between the protrusion 27 and the front end of the switch plate 26. In other words, the cam plate 25 and the switch plate 26 are so arranged that they may slide either as an integral body, each transmitting its sliding force in the fore-and-aft direction to the other through the spring 30, or, in cases where a load exceeding the constant force of the spring 30 is applied, separately along with an extension of the spring 30.

A cam groove 31 adapted to engage with the pin 17 of the rocking plate 14 is formed in the cam plate 25 so that the cam groove 31 lowers the pin 17 when the cam plate 25 slides forward from the back, and elevates the pin 17 when the cam plate 25 slides rearward from the front. A spring 32 is attached to the front end of the cam plate 25, with an end of the spring 32 positioned under the front part of the cam groove 31, so that the end of the spring 32 pushes the pin 17 upward when the pin 17 has moved to the front end of the cam 31. A loading rack 33 extending in the fore-and-aft direction is affixed to the underside of the cam plate. The loading rack 33 is capable of engaging with a drive gear 35 that is adapted to be rotated by a sub motor 34 disposed on the base plate 1, to the left side thereof.

A pin 36 adapted to be engaged in the cam groove 23 of the load arm 21 is formed on the switch plate 26, and a switch actuating portion 38 for turning the switch 37 on or off is formed at the lower part of the front end of the switch plate 26.

Next, the loading function for the loading mechanism 11 which loads a cassette tape C is explained hereunder.

As shown in FIGS. 6 and 8, when the loading mechanism 11 is at the ejecting position, the cam plate 25 and the switch plate 26 are at the rear; the rocking plate 14 and the cassette holder 13 are located above the cassette loading area 2 with the pin 17 therebetween; the cassette catcher 18 is at its front position; and the switch 37 is in the 'on' state as it is pushed by the switch actuating portion 38.

When a cassette tape C is inserted into the cassette holder 13, the end of the cassette tape C facing the direction of the insertion comes into contact with the abutting portion 19 of the cassette catcher 18, and the tooth portion 20 becomes engaged in a reel hole. When the cassette tape C is pushed further, the cassette catcher 18 is pushed rearward, and the load arm 21 rotates against the force of the spring 24 so that the switch plate 26 slides forward. As a result, the switch actuating portion 38 of the switch plate 26 moves forward, detaching itself from the switch 37 and thereby turning off the switch 37, so that the insertion of the cassette tape C is detected.

When the switch 37 is turned off, the sub motor 34 is actuated. As a result of the driving force transmitted through the loading rack 33, the cam plate 25 slides forward together with the switch plate 26, which slides forward integrally with the cam plate 25, thereby causing, through the load arm 21, the cassette catcher 18 to slide rearward so that the cassette catcher 18 pulls the cassette tape C into the cassette holder 13 toward a location above the cassette loading area 2. In addition, due to the engagement of the pin 17 in the cam groove 31 of the cam plate 25, the rocking plate 14 descends so that the cassette tape C, too, descends to the cassette loading area 2. Thus, the cassette tape C is loaded on the cassette loading area 2 as shown in FIGS. 7 and 9.

When ejecting the cassette tape C, the sub motor 34 is driven in reverse. As a result of the driving force transmitted through the loading rack 33, the cam plate 25 slides rearward together with the switch plate 26, and the rocking plate 14 is moved upward by the pin 17 that is engaged in the cam groove 31 of the cam plate 25, thereby lifting the cassette tape C from the cassette loading area 2. Then, the cassette catcher 18 slides forward together with the load arm 21, thereby ejecting the cassette tape C forward.

Figure 2:
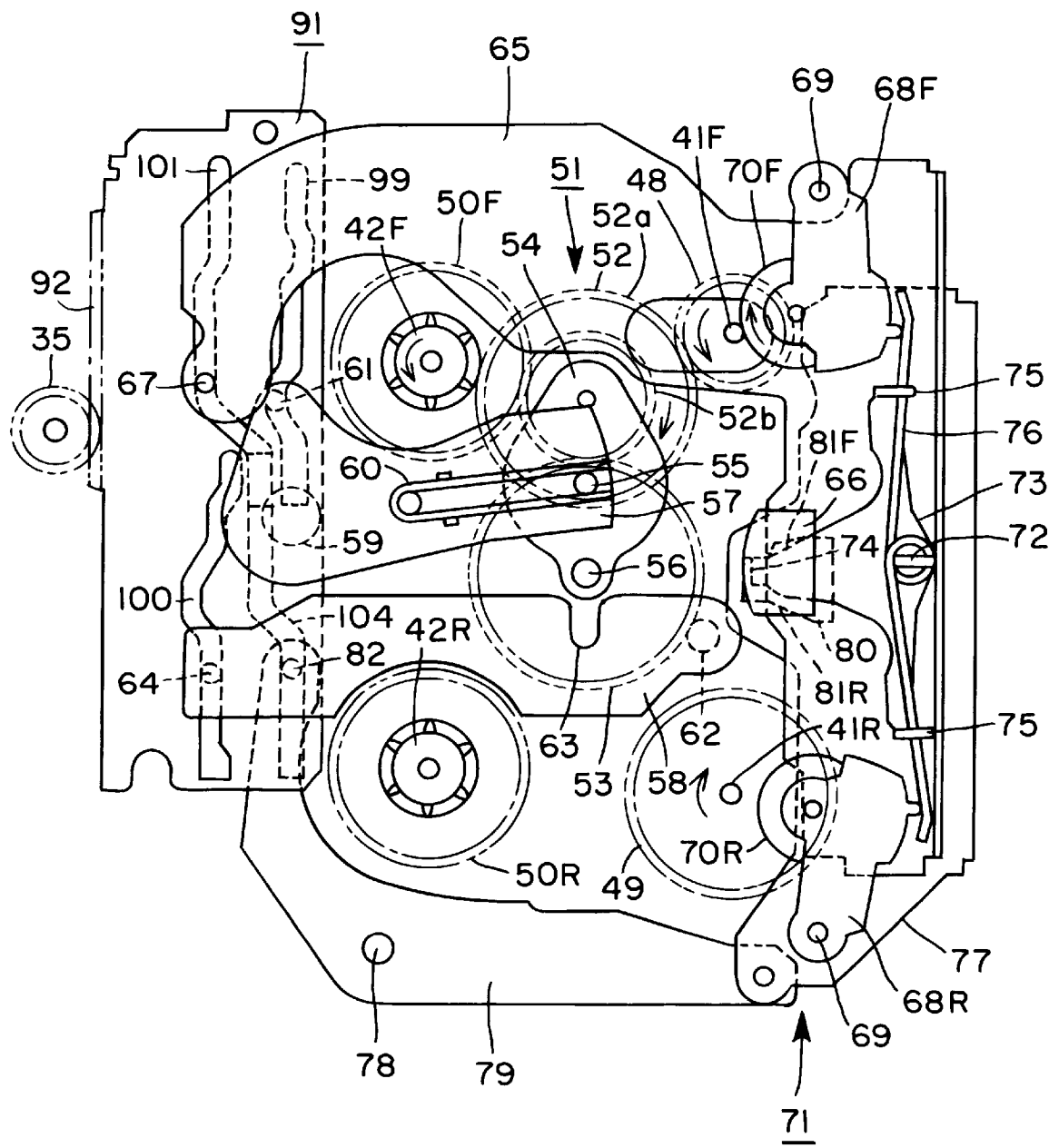
FIG. 2 is a schematic plan view of said cassette tape player in the forward-running mode.
Figure 3:
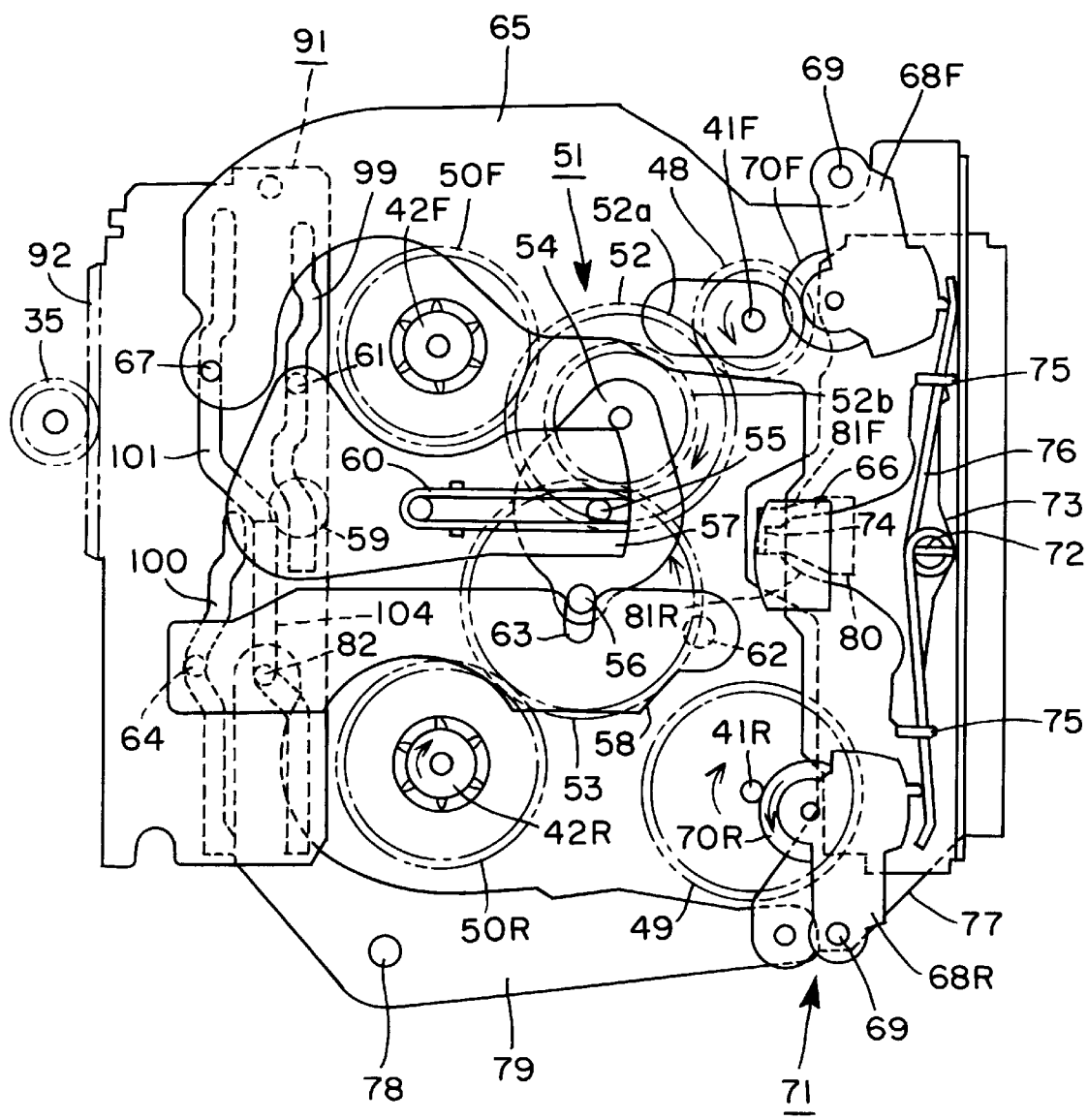
FIG. 3 is a schematic plan view of same in the reverse-running mode.
Figure 4:
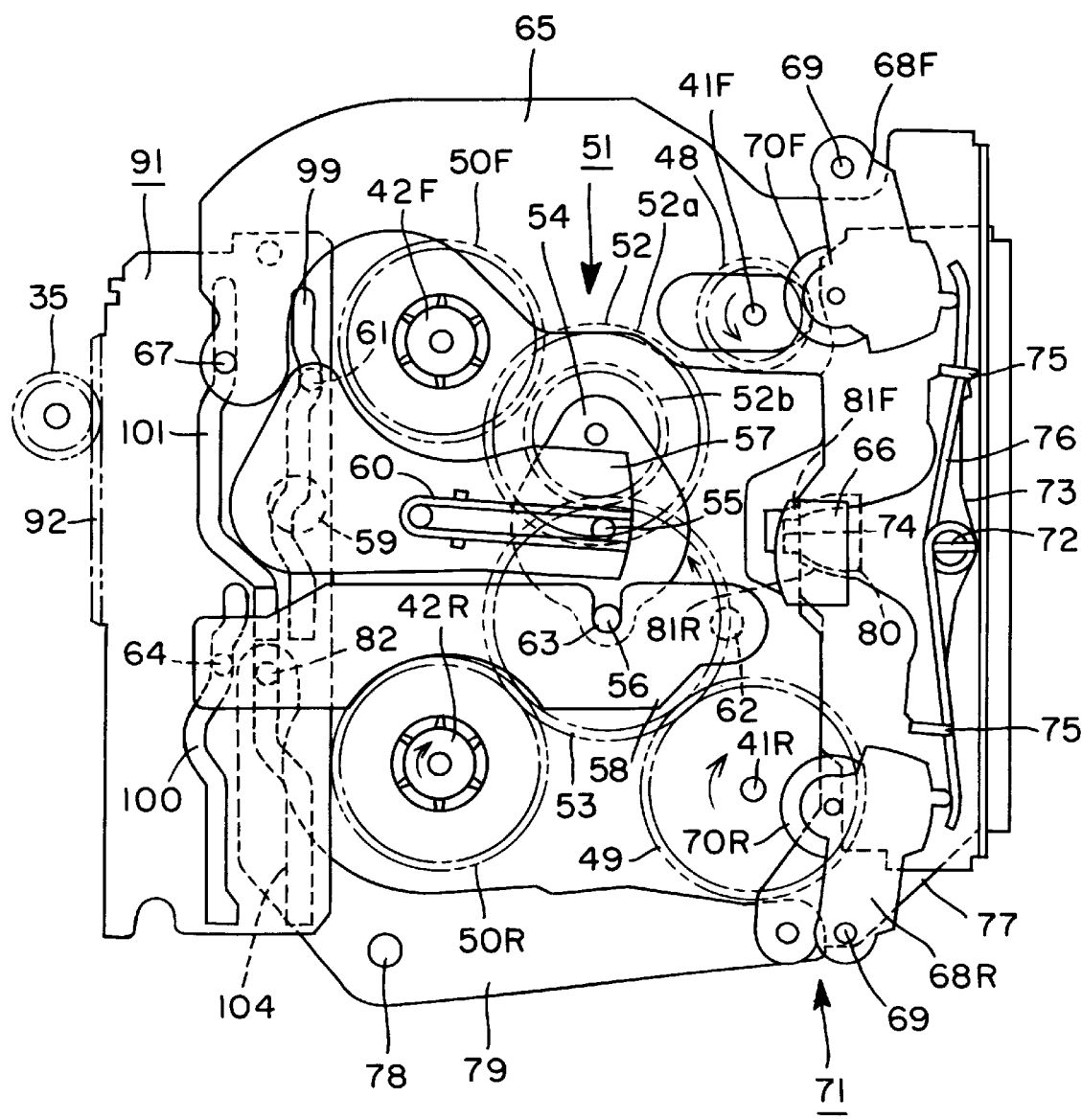
FIG. 4 is a schematic plan view of same in the rewinding mode.
Figure 5:
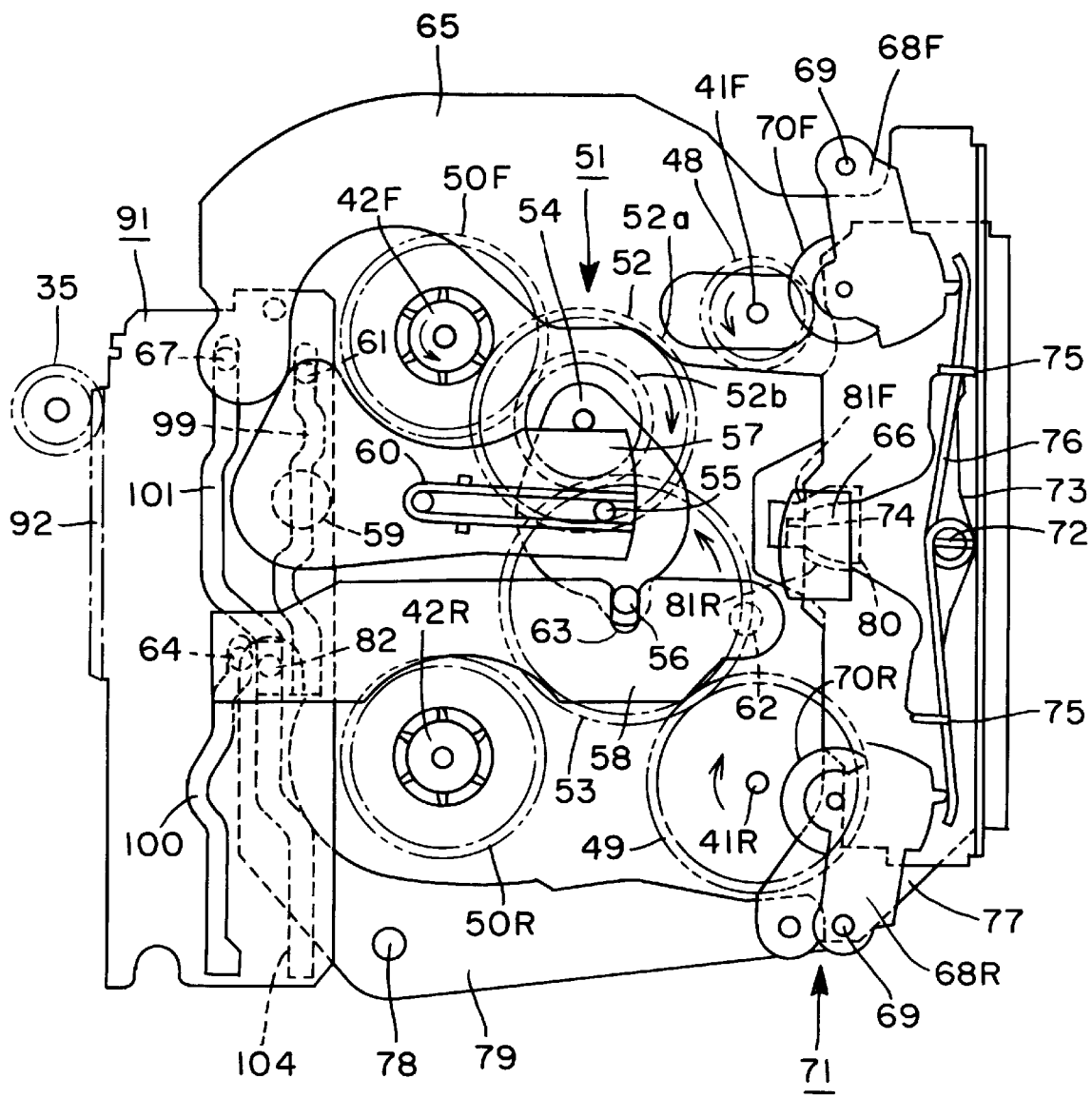
FIG. 5 is a schematic plan view of same in the fast-forward mode.

Referring to the drawings, FIG. 1 is a schematic plan view of a cassette tape player in the stand-by mode; FIG. 2 is a schematic plan view of the cassette tape player in the forward-running mode; FIG. 3 is a schematic plan view of the cassette tape player in the reverse-running mode; FIG. 4 is a schematic plan view of the cassette tape player in the rewinding mode; and FIG. 5 is a schematic plan view of the cassette tape player in the fast-forward mode.

A pair of capstans 41F,41R rotatably stand on the cassette loading area 2, the capstans 41F,41R adapted to run the tape of a cassette tape C respectively in the forward direction and the reverse direction. The cassette loading area 2 is also provided with a pair of reel blocks 42F,42R which are designed to engage with a pair of reels of a cassette tape C and respectively serve for the forward rotation and the reverse rotation of the tape.

Fly-wheels 43F,43R disposed under the base plate 1 are respectively fastened to the capstans 41F,41R. A belt 46 is extended in a loop around the fly-wheels 43F,43R, a driving pulley 44 disposed on the left-rear area of the base plate 1, and an intermediate pulley 45 disposed on the right-rear area of the base plate 1. A main motor 47 (shown in FIG. 6) serving as a driving means is disposed on the left-rear area of the base plate 1 and adapted to rotate the driving pulley 44 to rotate the capstans 41F,41R in the directions to which they respectively correspond, i.e. forward or in reverse (the direction indicated by an arrow in FIG. 1).

A low-speed gear 48 having a smaller diameter is attached to the forward-rotation capstan 41F with a low-speed clutch 141 (to be described later) therebetween, while a high-speed gear 49 having a diameter greater than that of the low-speed gear 48 is attached to the reverse-rotation capstan 41R with a high-speed clutch 142 (to be described later) therebetween. Reel gears 50F,50R are respectively affixed to the reel blocks 42F,42R. The low-speed gear 48 and the high-speed gear 49 are coaxial with the respective capstans 41F and 41R.

Disposed between the pair of capstans 41F,41R and the pair of reel blocks 42F,42R is a transmission changeover means 51 adapted to transmit the driving force from the low-speed gear 48 to the appropriate gear selected between the reel gears 50F,50R according to the direction in which the tape is run when the system is in either the forward mode or the reverse mode, and also from the high-speed gear 49 to the appropriate gear selected between the reel gears 50F,50R according to the direction of rotation of the tape when the system is in either the fast-forward mode or the rewinding mode.

The transmission changeover means 51 includes a pair of interlocked transmission gears 52,53, rotatably supported by a gear supporting plate 54. One of the transmission gears, i.e. the gear 52, comprises a large gear portion 52a capable of engaging with the low-speed gear 48, and a gear portion 52b which is smaller and capable of engaging with the reel gear 50F as well as the other transmission gear 53. The other transmission gear 53 is capable of engaging with the high-speed gear 49 and the reel gear 50R.

Shaft portions 55,56 are formed on the gear supporting plate 54, the shaft portion 55 protruding from the center of the gear supporting plate and the shaft portion 56 protruding from the end portion where the reverse-rotation components are located. A first rocking plate 57 is provided to rock the gear supporting plate 54 through the shaft portion 55 back and forth between the forward-rotation side and the reverse-rotation side. A second rocking plate 58 is provided to rock the gear supporting plate 54 through the shaft portion 56 in the direction of the capstans 41F,41R or in the direction of the reel blocks 42F,42R.

The first rocking plate 57 is rotatably attached through a supporting shaft portion 59 to the base plate 1, and the aforementioned shaft portion 55 is fitted in the end portion of the first rocking plate 57 with a minimal clearance so that the shaft portion 55 is capable of moving a very small degree. A spring 60 applying constant force to the shaft portion 55 in the directions of the forward-rotation side and the reverse-rotation side is attached to the first rocking plate 57. Further, a pin 61 adapted to engage with a mode changeover plate 91 (to be described later) protrudes from the first rocking plate 57.

The second rocking plate 58 is so attached through a supporting shaft portion 62 to the base plate 1 as to be capable of sliding toward the capstans 41F or the reel blocks 42F, and a catching groove 63 that permits the shaft portion 56 to be removably caught therein is formed in one of the side edges of the second rocking plate 58. Further, a pin 64 adapted to engage with the mode changeover plate 91 to be described later protrudes from the second rocking plate 58.

The transmission changeover means 51 is so structured as to be controlled by the mode changeover plate 91 to be described later. The transmission changeover means 51 does not transmit the driving force to the reel gears 50F,50R when the system is in the standby mode shown in FIG. 1. When the system is in the forward mode shown in FIG. 2, the transmission changeover means 51 transmits the driving force from the low-speed gear 48 through one of the transmission gears, i. e. the transmission gear 52, to the reel gear 50F for forward rotation. When the system is in the reverse mode shown in FIG. 3, the transmission changeover means 51 transmits the driving force from the low-speed gear 48 through the two transmission gears 52,53 to the reel gear 50R for reverse rotation. Further, the transmission changeover means 51 transmits the driving force from the high-speed gear 49 through the other transmission gear 53 to the reel gear 50R for reverse rotation in the rewinding mode shown in FIG. 4, and the transmission changeover means 51 transmits the driving force from the high-speed gear 49 through the two transmission gears 52,53 to the reel gear 50F for forward rotation in the fast-forward mode shown in FIG. 5.

A generally L-shaped head plate 65 is disposed on the base plate 1. The head plate 65 extends from the right-side area to the rear part of the base plate 1. A head 66 for performing playback or both recording and playback is mounted on the head plate 65, the head 66 adapted to come into contact with the tape of a cassette tape C and perform reading or writing of the tape. The head plate 65 is supported in such a manner as to be capable of easily sliding laterally as viewed in FIG. 1, i. e. in the direction in which the head 66 advances or retreats when it comes into contact with or separates from the tape of a cassette tape C. A pin 67 for catching the mode changeover plate 91 (described later) protrudes from the left end of the head plate 65.

The head plate 65 is adapted to move the head 66 to a stand-still position, i. e. the position where the head 66 is moved back away from the cassette tape C resulting from the mode changeover plate 91 (to be described later) being shifted to the stand-by position, to a playback (or a playback/ recording) position, where the head 66 is advanced to the cassette tape C resulting from the mode changeover plate 91 being shifted to the forward-mode position or the reverse-mode position, and to a fast-forward/rewinding position, where the head 66 is advanced to the cassette tape C until the head is lightly in contact with the tape, resulting from the mode changeover plate 91 being shifted to the fast-forward-mode position or the rewinding-mode position.

A pair of pinch arms 68F,68R are disposed on the base plate 1, at locations respectively corresponding to the two capstans 41F,41R and rockably supported by supporting shaft portions 69. The pinch arms 68F,68R rotatably support pinch rollers 70F,70R by means of shafts. The pinch rollers 70F,70R are adapted to come into contact with and move away from the capstans 41F,41R respectively. Springs that are not shown in the drawings apply constant force to the pinch arms 68F,68R in such a direction that the respective pinch rollers 70F,70R move away from the capstans 41F, 41R.

The pinch rollers 70F,70R adapted to come into contact with and move away from the capstans 41F,41R by means of a pinch roller changeover means 71, which includes a rocking member 73 rockably supported on the head plate 65 at a supporting shaft portion 72. A cam protrusion 74 and spring catching portions 75 are formed on the rocking member 73. The cam protrusion 74 is adapted to advance to a position underneath the head 66 and project downward, piercing through the base plate 1, and the spring catching portions 75 are adapted to respectively project toward the pinch arms 68F,68R. A pinch spring 76 is attached at the middle portion thereof to the supporting shaft portion 72 of the rocking member 73, with both ends of the pinch spring 76 respectively engaged with the spring catching portions 75. The pinch arms 68F,68R are in contact with both ends of the pinch spring 76 that protrude from the spring catching portions 75.

Arranged underneath the base plate 1 are a cam plate 77 located to the right and a link 79 located in the front area, the cam plate 77 being capable of sliding in the fore-and-aft direction, and the link 79 rockably supported by a supporting shaft portion 78.

A cam hole 80 for catching the cam protrusion 74 therein is formed in the camp plate 77. Two opposing edges of the cam hole 80 serves as forward and reverse cam edges 81F,81R, wherein the distance between the two cam edges gradually increases in the direction in which the head retreats.

The right end of the link 79 is rotatably connected to the cam plate 77, while a pin 82 for catching the mode changeover plate 91 (to be described later) protrudes from the left end of the link 79.

With the configuration of the pinch roller changeover means 71 as above, when the mode changeover plate 91 (to be described later) is selectively shifted to the stand-by position (shown in FIG. 1), the fast-forward-mode position (shown in FIG. 5) or the rewinding-mode position (shown in FIG. 4), the pinch rollers 70F,70R are moved so as to be separated from the capstans 41F,41R. As shown in FIG. 2, as a result of shifting the mode changeover plate 91 (described later) to the forward-mode position, the cam plate 77 moves forward, and the cam protrusion 74 comes into contact with the cam edge 81F along with the advancement of the head plate 65 and thereby rocks the rocking member 73 counterclockwise as viewed in FIG. 2, so that the pinch spring 76 causes the pinch roller 70F of the forward-rotation components to move toward the capstan 41F. Further, as shown in FIG. 3, as a result of shifting the mode changeover plate 91 (described later) to the reverse-mode position, the cam plate 77 moves backward, and the cam protrusion 74 comes into contact with the cam edge 81R along with the advancement of the head plate 65 and thereby rocks the rocking member 73 clockwise as viewed in FIG. 3, so that the pinch spring 76 causes the pinch roller 70R of the reverse-rotation components to move toward the capstan 41R.

Figure 10:
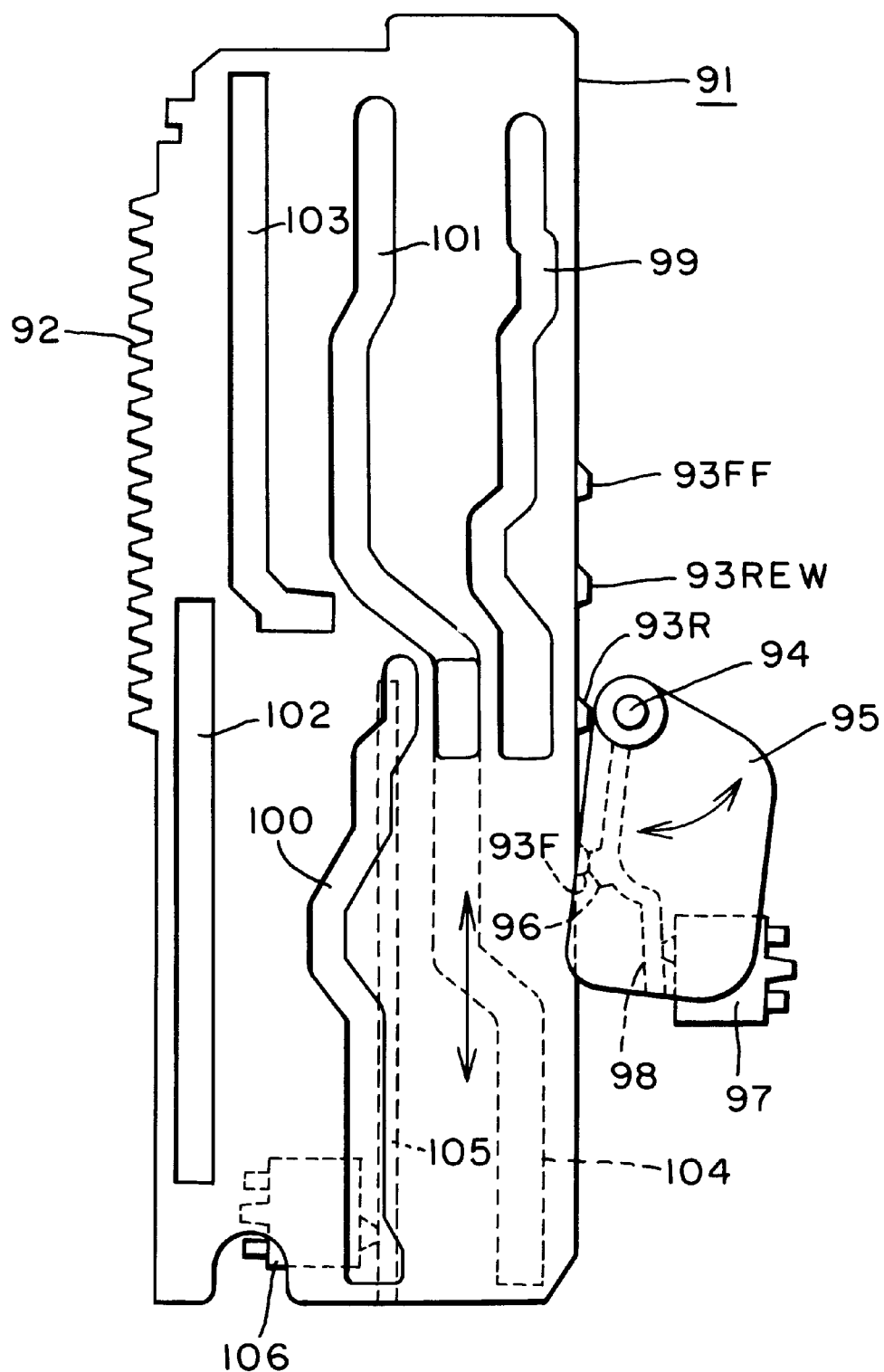
FIG. 10 is a plan view of a mode changeover plate of the cassette tape player.

The aforementioned mode changeover plate 91 is disposed on the underside of the base plate 1, toward the left side thereof, in such a manner as to be capable of sliding in the fore-and-aft direction. The mode changeover plate 91 is also shown in FIG. 10, which is a plan view of the mode changeover plate 91 of a cassette tape player.

The rear part of the left end of the mode changeover plate 91 is formed into a mode changeover rack 92, which extends in the fore-and-aft direction, parallel to the loading rack 33, and is adapted to be engaged with the drive gear 35. Further, how engagement of the drive gear 35 is switched from the loading rack 33 to the mode changeover rack 92, and from the mode changeover rack 92 to the loading rack 33, will be explained later.

Protrusions 93F,93R,93REW,93FF for respectively detecting positions to which the mode changeover plate 91 may be selectively moved, i. e. the forward-mode position (as shown in FIG. 2), the reverse-mode position (as shown in FIG. 3), the rewinding-mode position (as shown in FIG. 4) and the fast-forward-mode position (as shown in FIG. 4), are formed on the right edge of the mode changeover plate 91.

A mode detecting lever 95 is disposed at the right of the mode changeover plate 91 and rockably attached to the base plate 1 by means of a supporting shaft portion 94. An abutting portion 96 and a switch actuating portion 98 are formed on the mode detecting lever 95. Said abutting portion 96 is capable of catching the protrusions 93F,93R,93REW, 93FF, and the switch actuation portion 98 is adapted to turn on or off a mode detecting switch 97. When the abutting portion 96 of the mode detecting lever 95 comes into contact with each one of the protrusions 93F,93R,93REW,93FF and thereby rocks the mode detecting lever 95, the switch actuating portion 98 turns on the mode detecting switch 97 so that the position to which the mode changeover plate 91 has been shifted is detected based on how many times the mode detecting switch 97 has been turned on.

A cam groove 99 for catching the pin 61 of the first rocking plate 57 therein, a cam groove 100 for catching the pin 64 of the second rocking plate 58 therein, a cam groove 101 for catching the pin 67 of the head plate 65 therein, a cam groove 102 for catching a pin 117 (described later) of the leading rack 33 therein, and a cam groove 103 for catching a rear pin 116 of a timing arm 112 (described later) therein are formed on the top of the mode changeover plate 91. A cam groove 104 for catching the pin 82 of the link 79 therein is formed on the underside of the mode changeover plate 91.

A rib 105 extending in the fore-and-aft direction projects from the underside of the mode changeover plate 91. A switch 106 adapted to be turned on or off by means of the rib 105 is disposed at the left of the rib 105. Before the mode changeover plate 91 is moved to the forward-mode position, the reverse-mode position, the rewinding-mode position or the fast-forward-mode position, the rib 105 comes into contact with the switch 106, thereby turning on the switch 106. When the mode changeover plate 91 is moved from the forward-mode position shown in FIG. 2 to the stand-by position (shown in FIG. 1), which is located further to the rear, the rib 105 becomes detached from the switch 106, thereby turning it off, so that the shifting of the mode changeover plate 91 to the stand-by position may be detected.

With the configuration as above, the cassette tape player is adapted to be changed over to the stand-by mode by shifting the mode changeover plate 91 to the stand-by position as shown in FIG. 1, to the forward mode by shifting the mode changeover plate 91 to the forward-mode position as shown in FIG. 2, to the reverse mode by shifting the mode changeover plate 91 to the reverse-mode position as shown in FIG. 3, to the rewinding mode by shifting the mode changeover plate 91 to the rewinding mode position as shown in FIG. 4, and to the fast-forward mode by shifting the mode changeover plate 91 to the fast-forward mode position as shown in FIG. 5.

Figure 11:
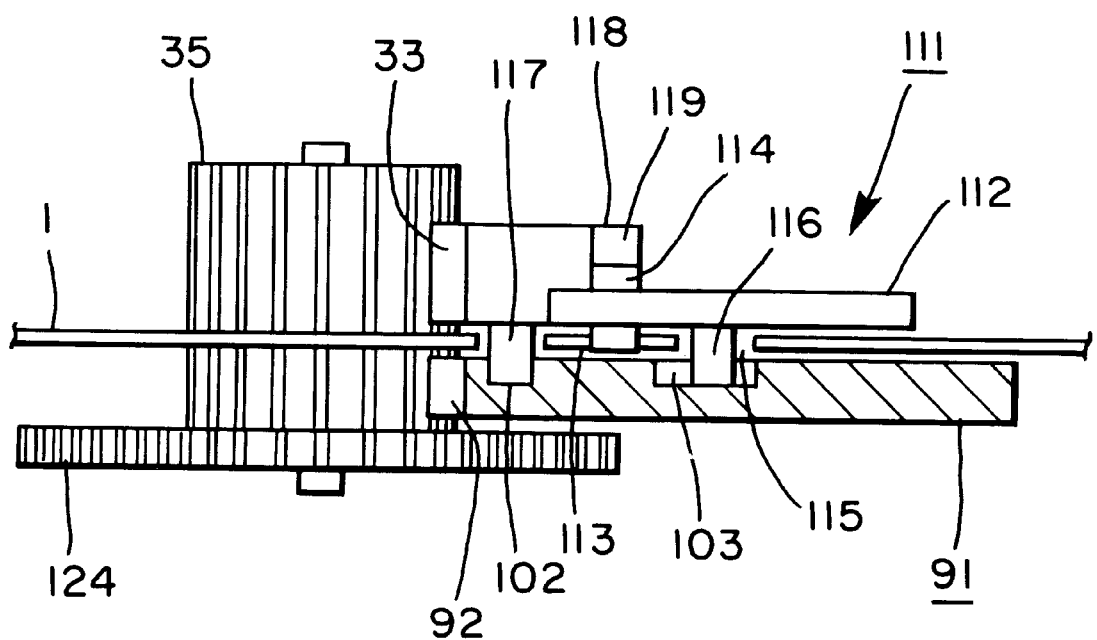
FIG. 11 is a partially cutout front view of a loading-associated mechanism of the cassette tape player.
Figure 12:
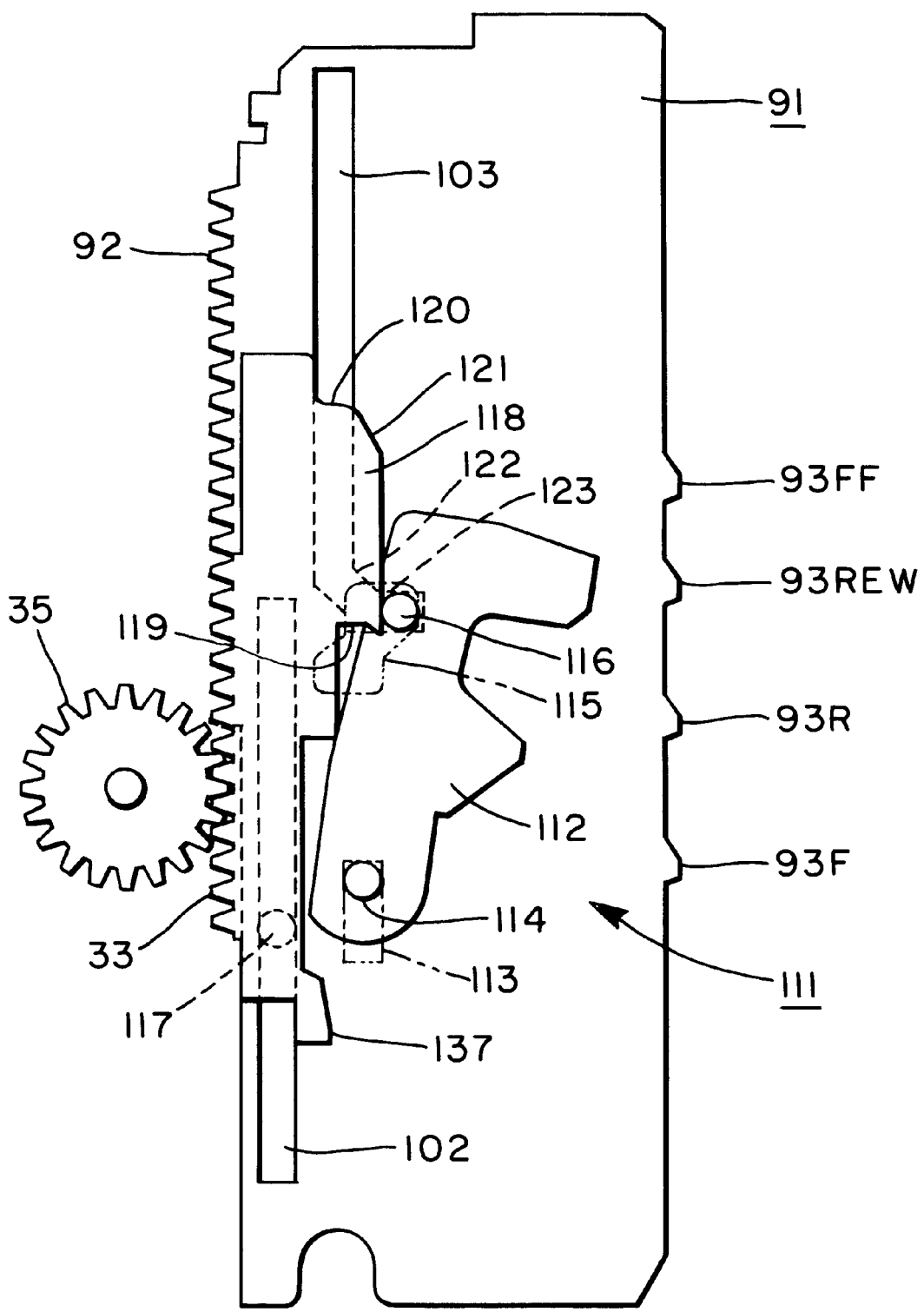
FIG. 12 is a plan view of the loading-associated mechanism of the cassette tape player in the state where a cassette tape is ejected.
Figure 13:
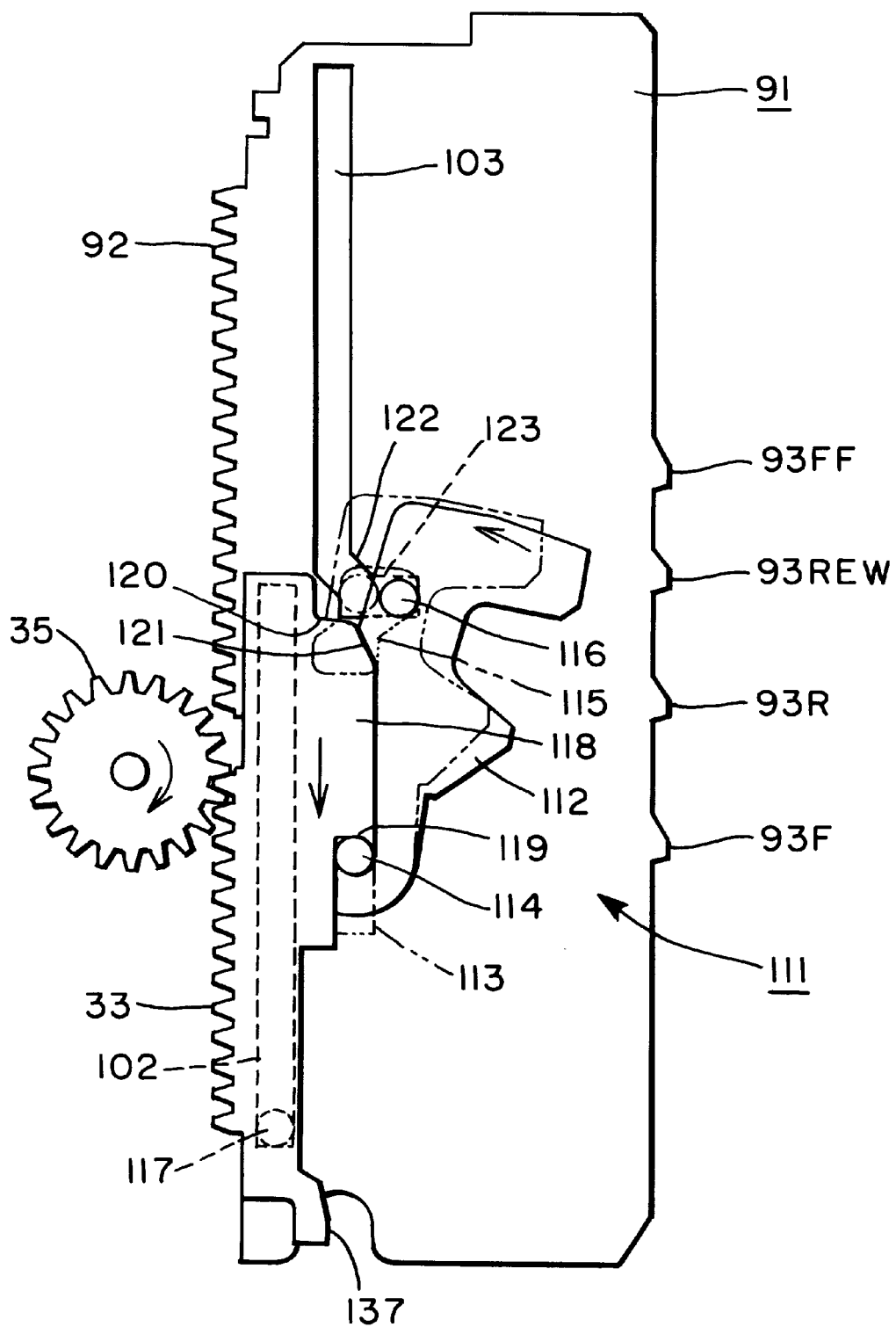
FIG. 13 is a plan view of the loading-associated mechanism of the cassette tape player in the state where a cassette tape is ejected, illustrating the stage following that shown in FIG. 12.
Figure 14:
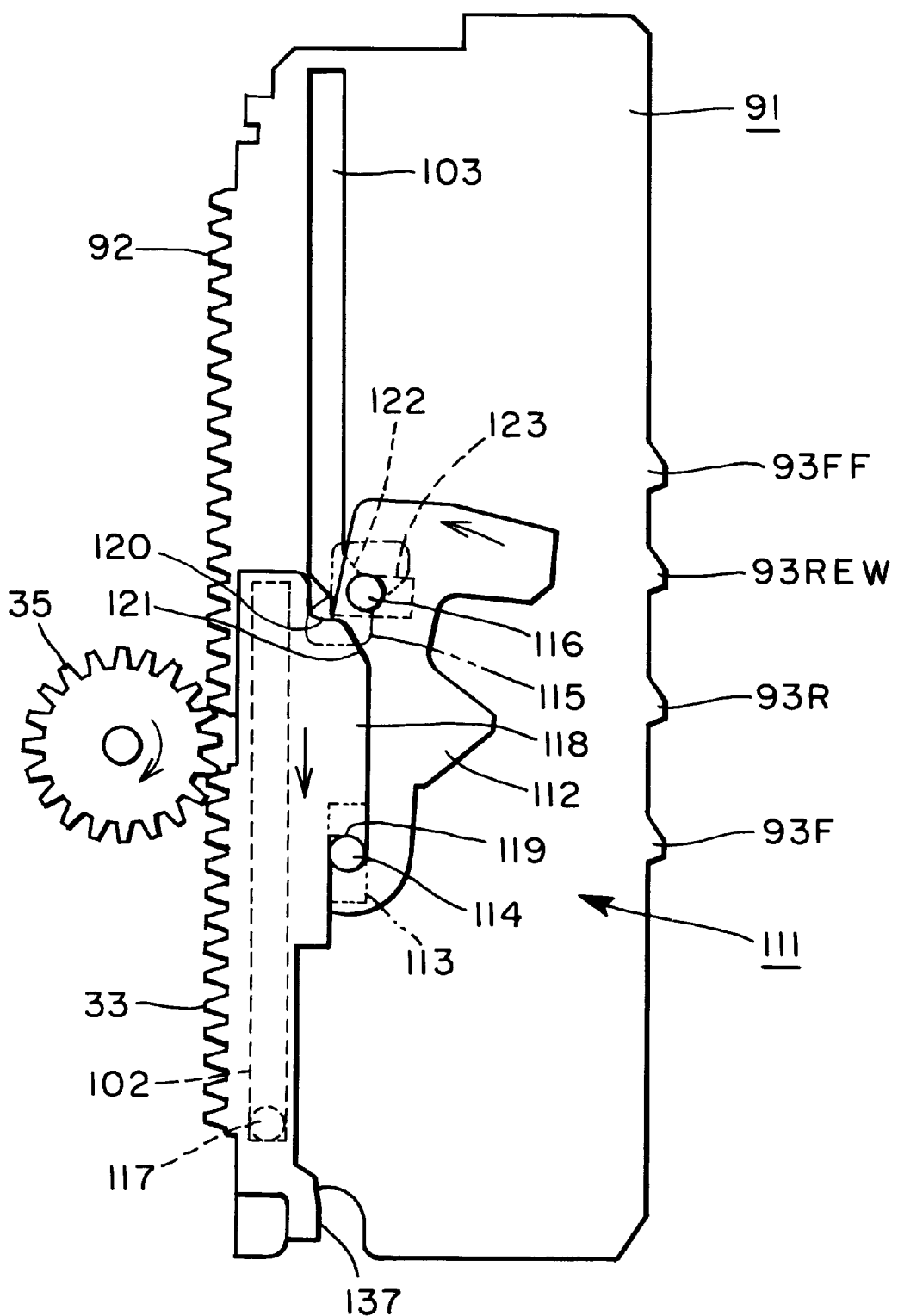
FIG. 14 is a plan view of the loading-associated mechanism of the cassette tape player, illustrating the stage following that shown in FIG. 13.
Figure 15:
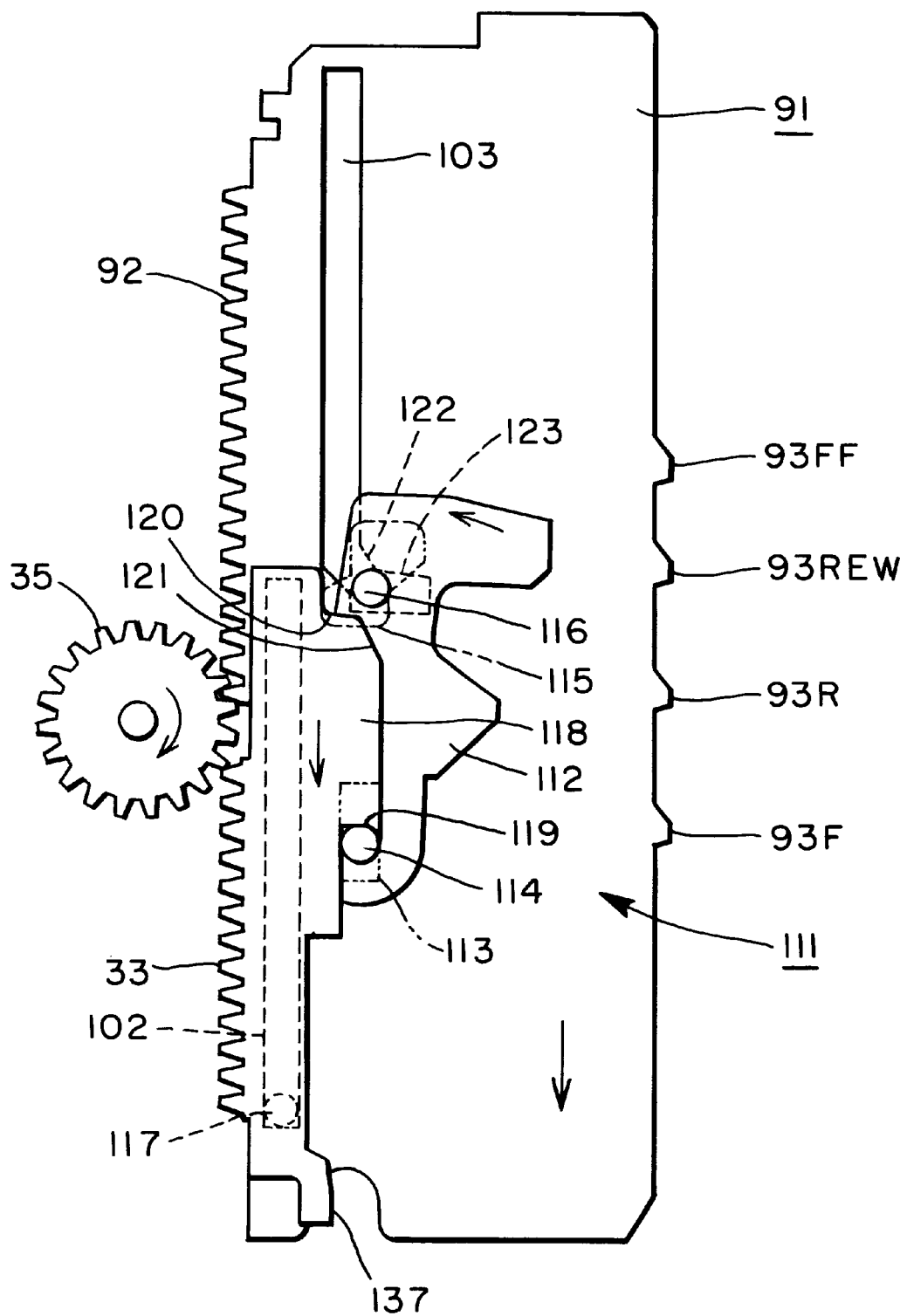
FIG. 15 is a plan view of the loading-associated mechanism of the cassette tape player, illustrating the stage following that shown in FIG. 14.
Figure 16:
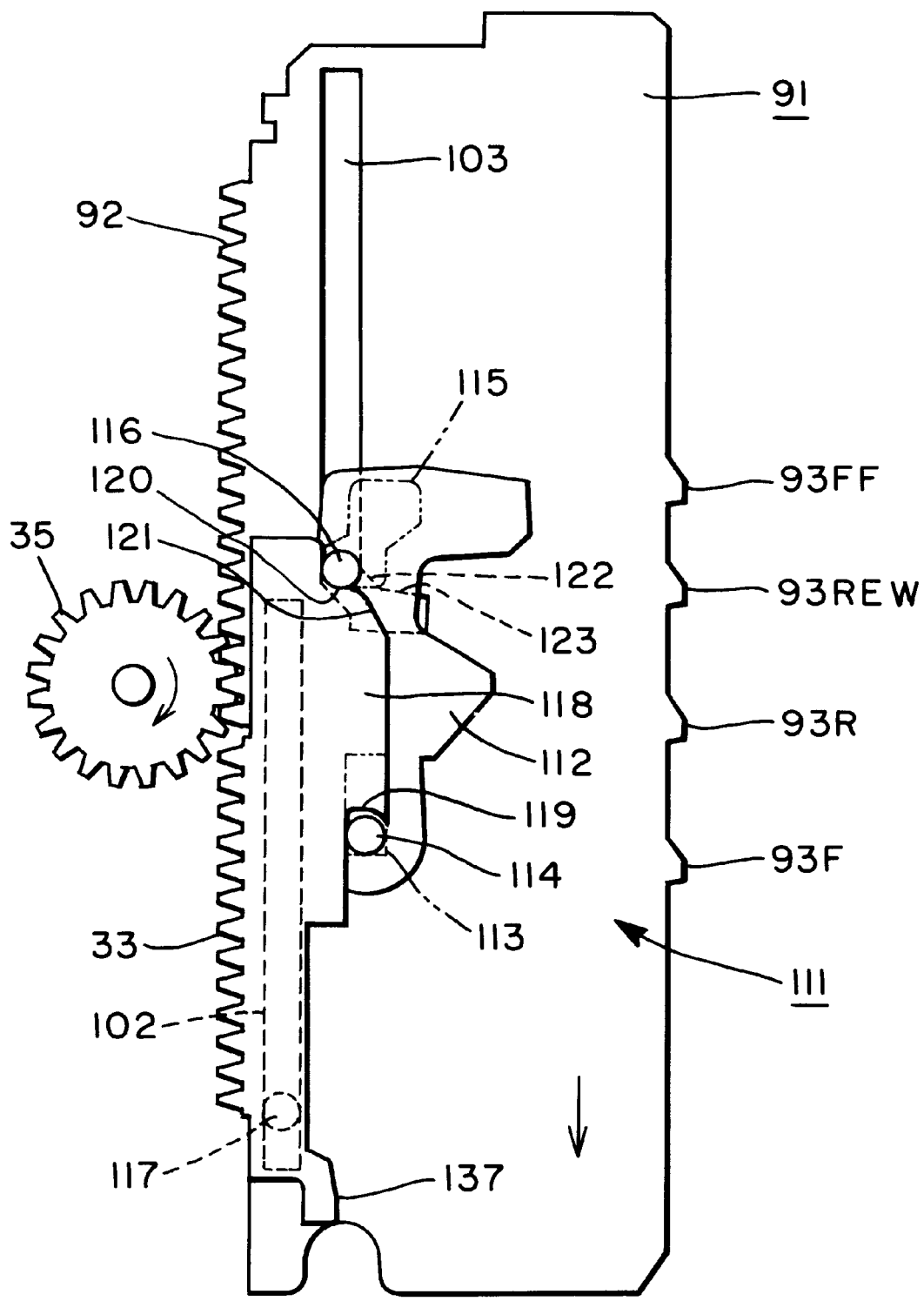
FIG. 16 is a plan view of the loading-associated mechanism of the cassette tape player, illustrating the stage following that shown in FIG. 15.

FIG. 10 is a plan view of a mode changeover plate of the cassette tape player; FIG. 11 is a partially cutout front view of a loading-associated mechanism of the cassette tape player; FIG. 12 is a plan view of the loading-associated mechanism of the cassette tape player in the state where a cassette tape is ejected; FIG. 13 is a plan view of the loading-associated mechanism of the cassette tape player in the state where a cassette tape is ejected, illustrating the stage following that shown in FIG. 12; FIG. 14 is a plan view of the loading-associated mechanism of the cassette tape player, illustrating the stage following that shown in FIG. 13; FIG. 15 is a plan view of the loading-associated mechanism of the cassette tape player, illustrating the stage following that shown in FIG. 14; and FIG. 16 is a plan view of the loading-associated mechanism of the cassette tape player, illustrating the stage following that shown in FIG. 15.

The cassette tape player includes an interlocking timing adjusting means 111 adapted to lock either the loading rack 33 or the mode changeover rack 92 at a position separated from the drive gear 35 when the other member, i.e. the loading rack 33 or the mode changeover rack 92, becomes engaged with the drive gear 35, bring the mode changeover rack 92 into engagement with the drive gear 35 when the loading rack 33 becomes disengaged from the drive gear 35 during a loading operation, and bring the loading rack 33 into engagement with the drive gear 35 when the mode changeover rack 92 becomes disengaged from the drive gear 35 during an ejecting operation.

The loading rack 33 and the mode changeover rack 92 are respectively disposed above and below the base plate 1, and the drive gear 35 passes through the base plate 1 so that it is capable of engaging the loading rack 33 and the mode changeover rack 92.

The interlocking timing adjusting means 111 includes a timing arm 112 which is disposed between the base plate 1 and the loading rack 33 and provided with a front pin 114 and a rear pin 116. The front pin 114 protrudes upward and downward from the front end of the timing arm 112 with its lower end engaged in an elongated hole 113 formed in the base plate 1 so as to extend in the fore-and-aft direction. The rear pin 116 projects downward from the rear end of the underside of the timing arm 112 and is adapted to be inserted through a cam hole 115 in the base plate 1 and engaged in the cam groove 103 of the mode changeover plate 91.

The loading rack 33 is provided with a pin 117 protruding from the front end of the underside of the loading rack 33, an extended portion 118 formed on the rear part of the right edge of the loading rack 33, a catching step 119 at the front end of the extended portion 118, a catching step 120 at the rear end of extended portion 118, and a slanted guide portion 121 at the right of the catching step 120. The pin 117 is adapted to pass through the base plate 1 and be engaged in the cam groove 102 of the mode changeover plate 91, the catching step 119 is adapted to be engaged with the front pin 114, and the catching step 120 is adapted to be engaged with the rear pin 116.

A locking groove 123 extending to the right is formed at the front end of the cam groove 103 with a diagonally extending guide groove portion 122 therebetween.

Next, a loading operation by the interlocking timing adjusting means 111 is explained hereunder.

In the state shown in FIG. 12 where a cassette tape is ejected, the loading rack 33 is engaged with the drive gear 35, and the rear pin 116 of the timing arm 112 is held in the locking groove 123 of the mode changeover plate 91 by means of the extended portion 118, so that the mode changeover plate 91 is locked in the state where its mode changeover rack 92 is not engaged with the drive gear 35.

Upon actuation of a loading operation, the drive gear 35 rotates as shown in FIG. 13, thereby moving the loading rack 33 forward. As a result, the catching step 119 at the front end of the extended portion 118 comes into contact with the front pin 114 of the timing arm 112, while the extended portion 118 moves forward to detach itself from the edge of the rear pin 116 of the timing arm 112, and the pin 117 of the loading rack 33 comes into contact with the cam groove 102.

Then, as shown in FIGS. 14 and 15, the forward movement of the loading rack 33 causes the front pin 114 to move the timing arm 112 forward and also permits the rear pin 116 to move forward in the cam hole 115 so that the rear pin 116 moves from the locking groove 123 to the guide groove portion 122 located at the left of the locking groove 123. At the same time, the mode changeover plate 91 moves forward by way of the pin 117 of the loading rack 33, thereby engaging its mode changeover rack 92 with the drive gear 35.

Then, as shown in FIG. 16, the mode changeover plate 91 moves forward by way of the mode changeover rack 92 so that the rear pin 116 of the timing arm 112 moves along the guide groove 122 into the cam groove 103 and that the cam hole 115 permits the rear pin 116 to move forward. As a result, the rear pin 116 push forward the catching step 120 at the rear part of the loading rack 33, thereby moving the loading rack 33 to a position where it is disengaged from the drive gear 35 and locking the loading rack 33 there. Thus, the loading operation is completed.

Therefore, after the loading operation is completed, the mode changeover plate 91 alone is moved in the fore-and-aft direction in accordance with changeover of mode.

Ejecting a cassette tape is done by reversing the process for loading a cassette tape. In other words, referring to FIG. 16, when the drive gear is rotated in reverse (in the direction opposite the arrow shown in FIG. 16), the mode changeover plate 91 moves rearward (see FIGS. 15 and 14) so that the rear pin 116 of the timing arm 112 moves from the cam groove 103 through the guide groove 122 toward the locking groove 123 while moving in the cam hole 115 rearward. The front pin 114 of the timing arm 112 moving rearward permits the loading rack 33 to move rearward, thereby engaging the loading rack 33 with the drive gear 35.

Then, the loading rack 33 engaged with the drive gear 35 in the stage shown in FIG. 14 moves rearward so that the rear pin 116 of the timing arm 112 is moved by the guide portion 121 of the loading rack 33 into the locking groove 123 located on the right as well as rearward inside the cam hole 115, thereby moving the mode changeover plate 91 rearward. As a result, the loading rack 33 comes into engagement with the drive gear 35 as shown in FIG. 12, and the extended portion 118 of the loading rack 33 holds the rear pin 116 of the timing arm 112 in the locking groove 123 of the mode changeover plate 91, thereby locking the mode changeover plate 91 in the state where its mode changeover rack 92 is not engaged with the drive gear 35.

As shown in FIGS. 11 and 1, a gear portion 124 with a large diameter is formed at the bottom of the drive gear 35 so that the rotational driving force from a motor gear 125 rotated by the sub motor 34 is transmitted to the gear portion 124 through a reduction gear train comprised of a plurality of gears.

Figure 17:
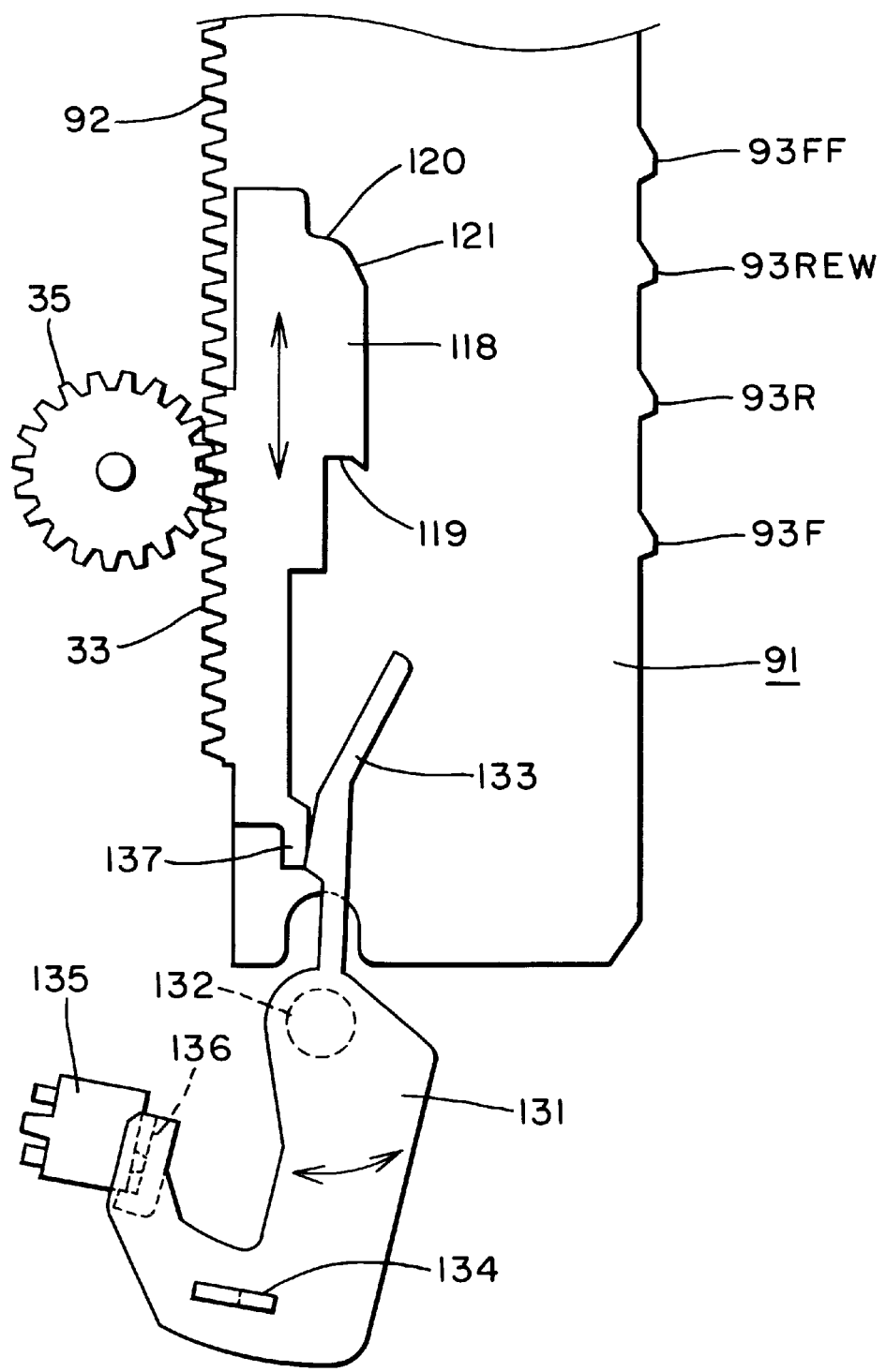
FIG. 17 is a plan view of a tape selecting mechanism of the cassette tape player.

Next, a plan view of the tape selecting mechanism of the cassette tape player is presented in FIG. 17.

A tape selector 131 is disposed on the base plate 1, at a location in front of the loading rack 33. The tape selector 131 is adapted to determine the type of the tape of a cassette tape C set on the cassette loading area 2 based on whether or not a tape selector hole is formed in the housing of the cassette tape C. The tape selector 131 is rotatably supported at a supporting shaft portion 132 at the middle thereof and has an abutting portion 133 projecting from the rear end, a detector portion 134 raised from the front end of the upper surface, and a switch actuating portion 136 formed on the underside of the front end of the tape selector 131. The abutting portion 133 is adapted to come into contact with the loading rack 33, the detector portion 134 is formed at a location corresponding to the tape selector hole of a cassette tape C and is capable of advancing into the selector hole, and the switch actuating portion 136 is adapted to turn a tape selector switch on or off.

A pushing protrusion 137 adapted to come into contact with the abutting portion 133 of the tape selector 131 is formed at the front end of the loading rack 33.

With the configuration as above, when loading a cassette tape C, the loading rack 33 moves forward so that the pushing protrusion 137 comes into contact with the abutting portion 133 of the tape selector 131 and that the detector portion 134 retreats out of the loading area for the cassette tape C. When the cassette tape C has been set on the cassette loading area 2, the pushing protrusion 137 moves closer to the front end than is the abutting portion 133, thereby permitting the tape selector 131 to rock.

At that time, in cases where the cassette tape C does not have a tape selector hole, the detector portion 134 comes into contact with the outer surface of the housing of the cassette tape C so that the switch actuating portion 136 pushes the tape selector switch 135 and thus keeps the switch 135 in the 'on' state. In cases where the cassette tape C is provided with a tape selector hole, the detector portion 134 can advance into the tape selector hole of the cassette tape C. Therefore, the tape selector switch 135 pushes the switch actuating portion 136, thereby rotating the tape selector 131. As a result, the tape selector switch 135 is turned off. Thus, the type of the tape is determined based on whether the tape selector switch 135 is on or off.

Figure 18A:
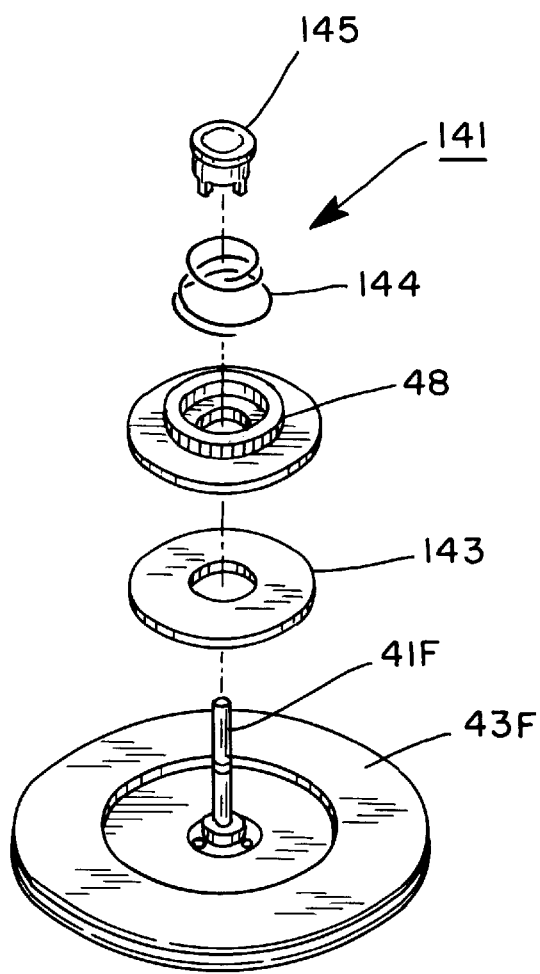
FIG. 18 shows a capstan-related mechanism of the cassette tape player, wherein (a) is a perspective view of the capstan-related mechanism of the forward-rotation components, and (b) is a perspective view of the capstan-related mechanism of the reverse-rotation components.
Figure 18B:
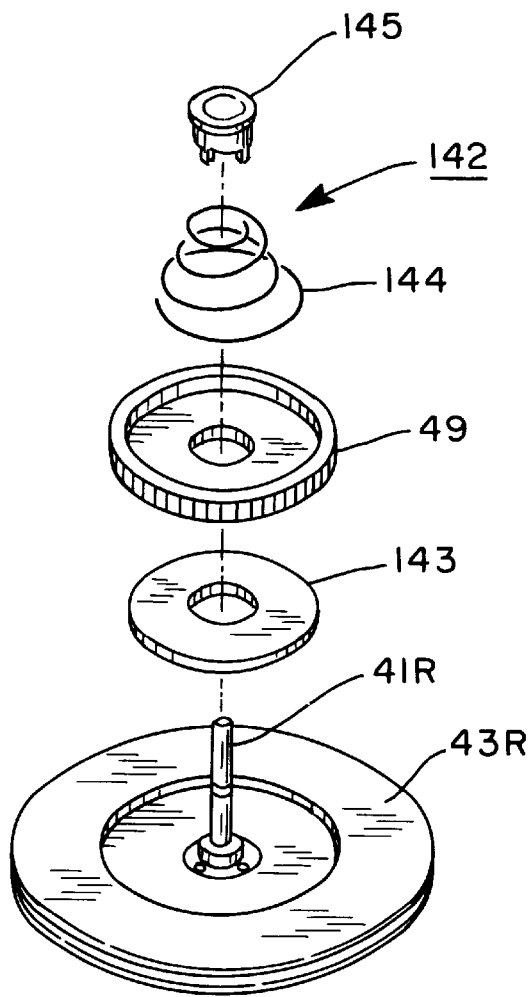

FIG. 18 shows a capstan-related mechanism of the cassette tape player, wherein (a) is a perspective view of the capstan-related mechanism at the forward-rotation side, and (b) is a perspective view of the capstan-related mechanism at the reverse-rotation side.

A low-speed clutch 141 is disposed between the fly wheel 43F for forward rotation and the low-speed gear 48, and a high-speed clutch 142 is disposed between the fly wheel 43R for reverse rotation and the high-speed gear 49.

The low-speed clutch 141 includes a ring-shaped friction member 143 which may be made of felt or a similar material and is disposed between the forward-rotation fly wheel 43F and the low-speed gear 48. A spring 144 is disposed on the low-speed gear 48, and a fastener 145 caught in the spring 144 is inserted through the low-speed gear 48 and the friction member 143 and attached to the fly wheel 43F in an engaged state therewith. Therefore, with the elastic force of the spring 144 pushing the low-speed gear 48 against the friction member 143, the fly wheel 43F and the low-speed gear 48 are in frictional contact with the friction member 143.

The high-speed clutch 142 includes a ring-shaped friction member 143 which may be made of felt or a similar material and is disposed between the reverse-rotation fly wheel 43R and the high-speed gear 49. A spring 144 is disposed on the high-speed gear 49, and a fastener 145 caught in the spring 144 is inserted through the high-speed gear 49 and the friction member 143 and attached to the fly wheel 43R in an engaged state therewith. Therefore, with the elastic force of the spring 144 pushing the high-speed gear 49 against the friction member 143, the fly wheel 43R and the high-speed gear 49 are in frictional contact with the friction member 143.

With the configuration as above, the low-speed clutch 141 and the high-speed clutch 142 are both adapted to transmit torque from the fly wheels 43F,43R to the low-speed gear 48 and the high-speed gear 49 respectively. In cases where the torque exceeds a given value, the corresponding clutch generates slipping, thereby preventing the torque from being transmitted.

Further, the low-speed clutch 141 and the high-speed clutch 142 are both easy to set their respective torques appropriate for a low speed and a high speed by setting the friction factors of the friction members 143, the elastic coefficients of the springs 144 or the like. Therefore, a small torque and a great torque are set for the low-speed clutch 141 and the high-speed clutch 142 respectively according to the reduction gear ratio from the low-speed gear 48 to the reel blocks 42F and the reduction gear ratio from the high-speed gear 49 to the reel block 42R so that, after all, the torques are nearly identical at the reel blocks 42F,42R.

Referring to FIG. 1, the transmission changeover means 51 is provided with an end detecting means 151 for detecting the end of the tape of a cassette tape C when the tape is running forward or in reverse. The end detecting means 151 includes a rotation detecting sensor 152 facing the underside of the transmission gear 53. The rotation detecting sensor 152 is formed of a reflection type photosensor which is designed to radiate detector light toward the transmission gear 53 and receive light reflected by the transmission gear 53. Slits 153 are formed at given intervals around the outer circumferential wall of the transmission gear 53.

Throughout rotation of the transmission gear 53, the lower surface of the transmission gear 53 and slits alternately face the rotation detecting sensor 152 so that on/off pulses are output from the rotation detecting sensor 152. When rotation of the transmission gear 53 stops, the rotation detecting sensor 152 stops outputting on/off pulses so that the end detecting means 151 detects the tape has come to an end.

The cassette tape player also has a control unit for controlling various functions of the cassette tape player, an operation unit for operating selection of a mode or other desired functions, and a display unit for displaying modes and other information, although these units are not shown in the drawings.

Next, how the entire cassette tape player operates according to the present embodiment is explained hereunder.
(1) When a cassette tape C is in the ejected state:
The loading mechanism 11 in the state where a cassette tape C is ejected is shown in FIGS. 6 and 8, wherein the cam plate 25 and the switch plate 26 are located in the rear, the rocking plate 14 and the cassette holder 13 are located above the cassette loading area 2 with the pin 17 therebetween, the cassette catcher 18 is at the front position, and the switch 37 is in the 'on' state as it is pushed by the switch actuating portion 38.
(2) Loading operation of a cassette tape C:
When a cassette tape C is inserted into the cassette holder 13 of the loading mechanism 11 in the state where the cassette is ejected, the end of the cassette tape C facing the direction of the insertion comes into contact with the abutting portion 19 of the cassette catcher 18, and the tooth portion 20 becomes engaged in a reel hole. When the cassette tape C is pushed further, the cassette catcher 18 is pushed rearward, and the load arm 21 rotates against the force of the spring 24 so that the switch plate 26 slides forward. As a result, the switch actuating portion 38 of the switch plate 26 moves forward, detaching itself from the switch 37 and thereby turning off the switch 37, so that the insertion of the cassette tape C is detected.

When the switch 37 is turned off, the sub motor 34 is driven. As a result of the driving force transmitted through the loading rack 33, the cam plate 25 slides forward together with the switch plate 26, which slides forward integrally with the cam plate 25, thereby causing, through the load arm 21, the cassette catcher 18 to slide rearward so that the cassette catcher 18 pulls the cassette tape C toward a location above the cassette loading area 2 so as to place the cassette tape C in the cassette holder 13. In addition, due to the engagement of the pin 17 in the cam groove 31 of the cam plate 25, the rocking plate 14 descends so that the cassette tape C, too, moves down to the cassette loading area 2. Thus, the cassette tape C is loaded on the cassette loading area 2 as shown in FIGS. 7 and 9.

Further, when the loading mechanism 11 is in the state where the cassette is ejected as shown in FIG. 12, the loading rack 33 is engaged with the drive gear 35, and the rear pin 116 of the timing arm 112 is held in the locking groove 123 of the mode changeover plate 91 by means of the extended portion 118, so that the mode changeover plate 91 is locked in the state where its mode changeover rack 92 is not engaged with the drive gear 35.

Upon actuation of a loading operation, the drive gear 35 rotates as shown in FIG. 13, thereby moving the loading rack 33 forward. As a result, the catching step 119 at the front end of the extended portion 118 comes into contact with the front pin 114 of the timing arm 112, while the extended portion 118 moves forward to detach itself from the edge of the rear pin 116 of the timing arm 112, and the pin 117 of the loading rack 33 comes into contact with the cam groove 102.

As shown in FIGS. 14 and 15, the forward movement of the loading rack 33 causes the front pin 114 to move the timing arm 112 forward and also permits the rear pin 116 to move forward in the cam hole 115 so that the rear pin 116 moves from the locking groove 123 to the guide groove portion 122 located at the left of the locking groove 123. At the same time, the mode changeover plate 91 moves forward by way of the pin 117 of the loading rack 33, thereby engaging its mode changeover rack 92 with the drive gear 35.

As shown in FIG. 16, the mode changeover plate 91 moves forward by way of the mode changeover rack 92 so that the rear pin 116 of the timing arm 112 moves along the guide groove 122 into the cam groove 103 and that the cam hole 115 permits the rear pin 116 to move forward. As a result, the rear pin 116 pushes forward the catching step 120 at the rear part of the loading rack 33, thereby moving the loading rack 33 to a position where it is disengaged from the drive gear 35 and locking the loading rack 33 there. Thus, the loading operation is completed.

Therefore, after the loading operation is completed, the mode changeover plate 91 alone moves in the fore-and-aft direction in accordance with the changeover of mode.

Upon completion of the loading, the mode changeover plate 91 moves to the stand-by position and comes to a standstill there as shown in FIG. 1, thereby switching the cassette tape player to the stand-by mode.

As a result of the movement of the mode changeover plate 91 to the stand-by position, the transmission gears 52,53 of the transmission changeover means 51 are not engaged with any one of members from among the low-speed gear 48, the high-speed gear 49 or the reel gears 50F,50R, the head 66 is moved back away from the cassette tape C, and the pinch rollers 70F,70R are respectively removed from the capstans 41F,41R. When the mode changeover plate 91 is at the stand-by position, the main motor 47 is at a standstill.

(3) Changeover to the forward mode

When the forward mode is selected by the operation unit (not shown) of the cassette tape player in the stand-by mode, driving of the sub motor 34 causes the mode changeover plate 91 to move from its stand-by position to the forward-mode position and stop there as shown in FIG. 2 so that the mode changeover plate 91 switches the cassette tape player to the forward mode. The mode changeover plate 91 is stopped at the forward-mode position as above, because the sub motor 34 is stopped when the protrusion 93F of the mode changeover plate 91 rocks the detecting lever 95, thereby turning on the mode detecting switch 97 once.

As a result of the movement of the mode changeover plate 91 to the forward-mode position, the first rocking plate 57 is swung toward the forward-rotation side by way of the cam groove 99 of the mode changeover plate 91 so that one of the gears of the transmission changeover means 51, i. e. the transmission gear 52, comes into engagement with the low-speed gear 48 and the reel gear 50F on the forward-rotation side, while the head plate 65 advances toward the cassette tape C by way of the cam groove 99 of the mode changeover plate 91 until the head plate 65 reaches the playback (or a playback/recording) position.

When the head plate 65 is advanced toward the cassette tape C, the cam plate 77 has been moved forward by the link 79 which is itself engaged with and has been moved by the cam groove 104 of the mode changeover plate 91. Therefore, through contact of the protrusion 74 with the cam edge 81F resulting from the advancement of the head plate 65, the rocking member 73 rocks counterclockwise as viewed in FIG. 2, so that the pinch spring 76 causes the pinch roller 70F at the forward-rotation side to move toward the capstan 41F.

When the movement of the mode changeover plate 91 to the forward-mode position is detected by the mode detecting switch 97, the main motor 47 is actuated.

Therefore, in the forward mode, the tape is run forward as held between the capstan 41F on the forward-rotation side and the pinch roller 70F, while the driving force is transmitted from the low-speed gear 48 through the transmission gear 52 to the reel gear 50F on the forward-rotation side to cause the reel block 42F to rotate the forwarding reel of the cassette tape C at a low speed, thereby taking up the tape fed from between the capstan 41F and the pinch roller 70F. Meanwhile, playback or recording in the forward mode is performed by the head 66 that is brought into contact with the tape while the tape is run forward.

Throughout rotation of the transmission gear 53, on/off pulses are output from the rotation detecting sensor 152. When rotation of the transmission gear 53 stops with the tape that is being run forward coming to the end, the output of on/off pulses from the rotation detecting sensor 152 stops. Based upon the termination of the output, the tape end is detected so that the main motor 47 comes to a standstill.

When the reel blocks 42F,42R stop rotation upon the tape coming to an end, slipping occurs on the low-speed clutch 141 between the fly wheel 43F and the low-speed gear 48, thereby reducing the burden imposed on the tape, the main motor 47 and other relevant components.

(4) Changeover to the reverse mode

When the reverse mode is selected by the operation unit (not shown) of the cassette tape player in the course of the stand-by mode, driving of the sub motor 34 causes the mode changeover plate 91 to move from its stand-by position to the reverse-mode position and stop there as shown in FIG. 3 so that the mode changeover plate 91 switches the cassette tape player to the reverse mode. The mode changeover plate 91 is stopped at the reverse-mode position as above, because the sub motor 34 is stopped when the protrusions 93F,93R of the mode changeover plate 91 rocks the detecting lever 95 twice, thereby turning on the mode detecting switch 97 twice.

As a result of the movement of the mode changeover plate 91 to the reverse-mode position, the first rocking plate 57 is swung to a position halfway between the forward-rotation side and the reverse-rotation side by way of the cam groove 99 of the mode changeover plate 91, while the second rocking plate 58 is swung toward the reel blocks 42F,42R by way of the cam groove 100. This causes the transmission gear 52, which is one of the gears of the transmission changeover means 51, to come into engagement with the low-speed gear 48 and the other gear, i. e. the transmission gear 53, to come into engagement with the reverse reel gear 50R, while the head plate 65 advances toward the cassette tape C by way of the cam groove 99 of the mode changeover plate 91 until the head plate 65 reaches the playback (or a playback/recording) position.

When the head plate 65 is advanced toward the cassette tape C, the cam plate 77 is moved rearward by the link 79 engaged with and moved by the cam groove 104 of the mode changeover plate 91, and, through contact of the protrusion 74 with the cam edge 81R resulting from the advancement of the head plate 65, the rocking member 73 rocks clockwise as viewed in FIG. 3, so that the pinch spring 76 causes the reverse pinch roller 70R to move toward the capstan 41R.

When the movement of the mode changeover plate 91 to the reverse-mode position is detected by the mode detecting switch 97, the main motor 47 is actuated.

Therefore, in the reverse mode, the tape is run in reverse as held between the reverse capstan 41R and the pinch roller 70R, while the driving force is transmitted from the low-speed gear 48 through the two transmission gears 52,53 to the reel gear 50R on the reverse-rotation side to cause the reel block 42R to rotate the reversing reel of the cassette tape C at a low speed, thereby taking up the tape fed from between the capstan 41R and the pinch roller 70R. Meanwhile, reverse-mode playback or recording is performed by the head 66 that is brought into contact with the tape while the tape is run in reverse.

Throughout rotation of the transmission gear 53, on/off pulses are output from the rotation detecting sensor 152.

When rotation of the transmission gear 53 stops with the tape that is being run in reverse coming to an end, the output of on/off pulses from the rotation detecting sensor 152 stops. Based upon the termination of the output, the tape end is detected so that the main motor 47 comes to a standstill.

When the reel blocks 42F,42R stop rotation upon the tape coming to an end, slipping occurs on the low-speed clutch 141 between the fly wheel 43F and the low-speed gear 48, thereby reducing the burden imposed on the tape, the main motor 47 and other relevant components.

(5) Changeover to the rewinding mode

When the rewinding mode is selected by the operation unit (not shown) of the cassette tape player in the course of the stand-by mode, driving of the sub motor 34 causes the mode changeover plate 91 to move from its stand-by position to the rewinding-mode position and stop there as shown in FIG. 4 so that the mode changeover plate 91 switches the cassette tape player to the rewinding mode. The mode changeover plate 91 is stopped at the rewinding-mode position as above, because the sub motor 34 is stopped when the protrusions 93F,93R,93REW of the mode changeover plate 91 rocks the detecting lever 95 three times, thereby turning on the mode detecting switch 97 three times.

As a result of the movement of the mode changeover plate 91 to the rewinding-mode position, the first rocking plate 57 is swung toward the reverse-rotation side by way of the cam groove 99 of the mode changeover plate 91, while the second rocking plate 58 is swung to a position halfway between the capstans 41F,41R and the reel blocks 42F,42R by way of the cam groove 100. This causes the transmission gear 53 of the transmission changeover means 51 to come into engagement with the high-speed gear 49 and the reverse reel gear 50R, while the head plate 65 advances toward the cassette tape C by way of the cam groove 99 of the mode changeover plate 91 until the head plate 65 reaches the fast-forward/rewinding position.

The pinch rollers 70F,70R are held at a distance from the capstans 41F,41R respectively.

When the movement of the mode changeover plate 91 to the rewinding-mode position is detected by the mode detecting switch 97, the main motor 47 is actuated.

Therefore, in the rewinding mode, the driving force is transmitted from the high-speed gear 49 through the transmission gear 53 to the reverse reel gear 50R to cause the reel block 42R to rotate the reversing reel of the cassette tape C at a high speed, thereby fast-rewinding the tape in the reverse direction. During this operation, as the head 66 is lightly in contact with the tape that is being rewound in the reverse direction, it is possible to find blank portions between recorded materials.

Throughout rotation of the transmission gear 53, on/off pulses are output from the rotation detecting sensor 152. When rotation of the transmission gear 53 stops with the tape that is being run in reverse coming to an end, the output of on/off pulses from the rotation detecting sensor 152 stops. Based upon the termination of the output, the tape end is detected so that the main motor 47 comes to a standstill.

When the reel blocks 42F,42R stop rotation upon the tape coming to an end, slipping occurs on the high-speed clutch 142 between the fly wheel 43R and the high-speed gear 49, thereby reducing the burden imposed on the tape, the main motor 47 and other relevant components.

(6) Changeover to the fast-forward mode

When the fast-forward mode is selected by the operation unit (not shown) of the cassette tape player during the stand-by mode, driving of the sub motor 34 causes the mode changeover plate 91 to move from its stand-by position to the fast-forward-mode position and stop there as shown in FIG. 5 so that the mode changeover plate 91 switches the cassette tape player to the fast-forward mode. The mode changeover plate 91 is stopped at the fast-forward-mode position as above, because the sub motor 34 is stopped when the protrusions 93F,93R,93REW,93FF of the mode changeover plate 91 rocks the detecting lever 95 four times, thereby turning on the mode detecting switch 97 four times.

As a result of the movement of the mode changeover plate 91 to the fast-forward-mode position, the first rocking plate 57 is swung to a position halfway between the forward-rotation side and the reverse-rotation side by way of the cam groove 99 of the mode changeover plate 91, while the second rocking plate 58 is swung toward the capstans 41F,41R by way of the cam groove 100. This causes the transmission gear 53 of the transmission changeover means 51 to come into engagement with the high-speed gear 49 and the transmission gear 52 to come into engagement with the reel gear 50F on the forward-rotation side, while the head plate 65 advances toward the cassette tape C by way of the cam groove 99 of the mode changeover plate 91 until the head plate 65 reaches the fast-forward/rewinding position.

The pinch rollers 70F,70R are held at a distance from the capstans 41F,41R respectively.

When the movement of the mode changeover plate 91 to the fast-forward-mode position is detected by the mode detecting switch 97, the main motor 47 is actuated.

Therefore, in the fast-forward mode, the driving force is transmitted from the high-speed gear 49 through the two transmission gears 52,53 to the forward reel gear 50F to cause the reel block 42F to rotate the forwarding reel of the cassette tape C at a high speed, thereby fast-forwarding the tape. During this operation, as the head 66 is lightly in contact with the tape that is being fast-forwarded, it is possible to find blank portions between recorded materials.

Throughout rotation of the transmission gear 53, on/off pulses are output from the rotation detecting sensor 152. When rotation of the transmission gear 53 stops with the tape that is being run forward coming to the end, the output of on/off pulses from the rotation detecting sensor 152 stops. Based upon the termination of the output, the tape end is detected so that the main motor 47 comes to a standstill.

When the reel blocks 42F,42R stop rotation upon the tape coming to an end, slipping occurs on the high-speed clutch 142 between the fly wheel 43R and the high-speed gear 49, thereby reducing the burden imposed on the tape, the main motor 47 and other relevant components.

(7) Changeover from a mode to another mode

During the forward mode, the reverse mode, the rewinding mode or the fast-forward mode, when any mode other than the stop mode (the stand-by mode) or the current mode is selected by the operation unit (not shown) of the cassette tape player, the main motor 47 stops and the sub motor 34 is then driven to cause the mode changeover plate 91 to move to the position corresponding to the mode that has been selected. Meanwhile, driving of the main motor 47 is resumed so that the selected mode is performed.

(8) Changeover to the stand-by mode

When the stand-by mode is selected by the operation unit (not shown) of the cassette tape player in the course of the forward mode, the reverse mode, the rewinding mode or the fast-forward mode, the main motor 47 stops and the sub motor 34 is then driven in reverse to cause the mode changeover plate 91 to move to the stand-by position, thereby switching the cassette tape player to the stand-by mode shown in FIG. 1.

(9) Ejection of a cassette tape C

Ejection of a cassette tape C is done by reversing the process for loading a cassette tape C. To be more specific, referring to FIG. 16, when the drive gear 35 is rotated in reverse (in the direction opposite the arrow shown in FIG. 16), the mode changeover plate 91 moves rearward (see FIGS. 15 and 14) so that the rear pin 116 of the timing arm 112 moves from the cam groove 103 through the guide groove 122 toward the locking groove 123 while moving rearward inside the cam hole 115. The front pin 114 of the timing arm 112 moving rearward permits the loading rack 33 to move rearward, thereby engaging the loading rack 33 with the drive gear 35.

The loading rack 33 engaged with the drive gear 35 in the stage shown in FIG. 14 moves rearward so that the guide portion 121 of the loading rack 33 moves the rear pin 116 of the timing arm 112 into the locking groove 123 located at the right. The guide portion 121 of the loading rack 33 also moves the rear pin 116 rearward inside the cam hole 115 so that the rear pin 116 moves the mode changeover plate 91 rearward. As a result, the loading rack 33 comes into engagement with the drive gear 35 as shown in FIG. 12, and the extended portion 118 of the loading rack 33 holds the rear pin 116 of the timing arm 112 in the locking groove 123 of the mode changeover plate 91, thereby locking the mode changeover plate 91 in the state where its mode changeover rack 92 is not engaged with the drive gear 35.

When the cassette tape C is ejected, the sub motor 34 is driven in reverse. As a result of the driving force transmitted through the loading rack 33, the cam plate 25 slides rearward together with the switch plate 26, and the pin 17 engaged in the cam groove 31 of the cam plate 25 moves the rocking plate 14 upward, thereby lifting the cassette tape C from the cassette loading area 2. Then, the cassette catcher 18 slides forward together with the load arm 21, thereby ejecting the cassette tape C forward.

As described above, one of the capstans, i. e. the capstan 41F, is provided with the low speed gear 48, while the other capstan, i. e. the capstan 41R, is provided with the high speed gear 49. In association with this, the transmission changeover means 51 serves to transmit the driving force from the low-speed gear 48 of the capstan 41F to the appropriate gear selected between the reel gears 50F,50R according to the direction in which the tape is run when the system is in either the forward mode or the reverse mode, and transmit the driving force from the high-speed gear 49 of the capstan 41R to the appropriate gear selected between the reel gears 50F,50R according to the direction of rotation of the tape when the system is in either the fast-forward mode or the rewinding mode. As the mechanism of transmitting the driving force to the pair of reel blocks 42F,42R is thus shared by the forward-rotation components and the reverse-rotation components, the embodiment described above is capable of reducing the number of parts and simplifying the structure.

The transmission changeover means 51 has transmission gears 52,53 disposed between the pair of capstans 41F,41R and the pair of reel blocks 42F,42R. Therefore, the transmission changeover means 51 is capable of performing transmission changeover easily and reliably by rocking the transmission gears 52,53 either toward the forward-rotation components or the reverse-rotation components, and also in the direction of either the capstans 41F,41R or the reel blocks 42F,42R.

As the end detecting means 151 monitors rotation of the transmission gear 53 and detects the tape end based on detection of rotation of the transmission gear 53 coming to a stop, there is no need of providing each one of the two reel blocks 42F,42R with an end detecting means 151 or separately installing a detecting mechanism dedicated for each respective reel block. Thus, the embodiment described above is capable of reducing the number of parts and simplifying the structure.

As a low-speed clutch 141 is installed between one of the fly wheels, i. e. the fly wheel 43F, and the low-speed gear 48, while a high-speed clutch 142 is installed between the fly wheel 43R that is the other fly wheel and the high-speed gear 49, it is easy to set respective torques appropriate for a low speed and a high speed.

As any mode can be selected and performed from among the forward mode, the reverse mode, the rewinding mode and the fast-forward mode by shifting a single unit of a mode changeover plate 91, the embodiment described above is capable of reducing the number of parts and simplifying the structure.

As the head 66 can be moved toward or away from a cassette tape C by shifting a single unit of a mode changeover plate 91 according to each respective mode, the embodiment described above is capable of reducing the number of parts and simplifying the structure.

Furthermore, as the pinch roller 70F,70R can be brought into contact with or separated from the capstans 41F,41R by shifting a single unit of a mode changeover plate 91 according to each respective mode, the embodiment described above is capable of reducing the number of parts and simplifying the structure.

The loading mechanism 11 performs the loading function and the ejecting function by means of the loading rack 33 that is adapted to be engaged with the drive gear 35, and the mode changeover plate 91 is adapted to be shifted by means of the mode changeover rack 92 that is adapted to be engaged with the drive gear 35. As the loading mechanism 11 and the mode changeover plate 91 are designed to be driven by a common sub motor 34 that drives the drive gear 35, the embodiment described above is capable of reducing the number of parts and simplifying the structure. Furthermore, the interlocking timing adjusting means 111 permits either the loading rack 33 or the mode changeover rack 92 to be locked at a position separated from the drive gear 35 when the other member, i.e. the loading rack 33 or the mode changeover rack 92, becomes engaged with the drive gear 35. The interlocking timing adjusting means 111 also brings the mode changeover rack 92 into engagement with the drive gear 35 when the loading rack 33 becomes disengaged from the drive gear 35 during a loading operation, and the loading rack 33 into engagement with the drive gear 35 when the mode changeover rack 92 becomes disengaged from the drive gear 35 during an ejecting operation. Thus, reliable engagement of the loading rack 33 with the drive gear 35 as well as reliable engagement of or the mode changeover rack 92 with the drive gear 35 are ensured.

Figure 19:
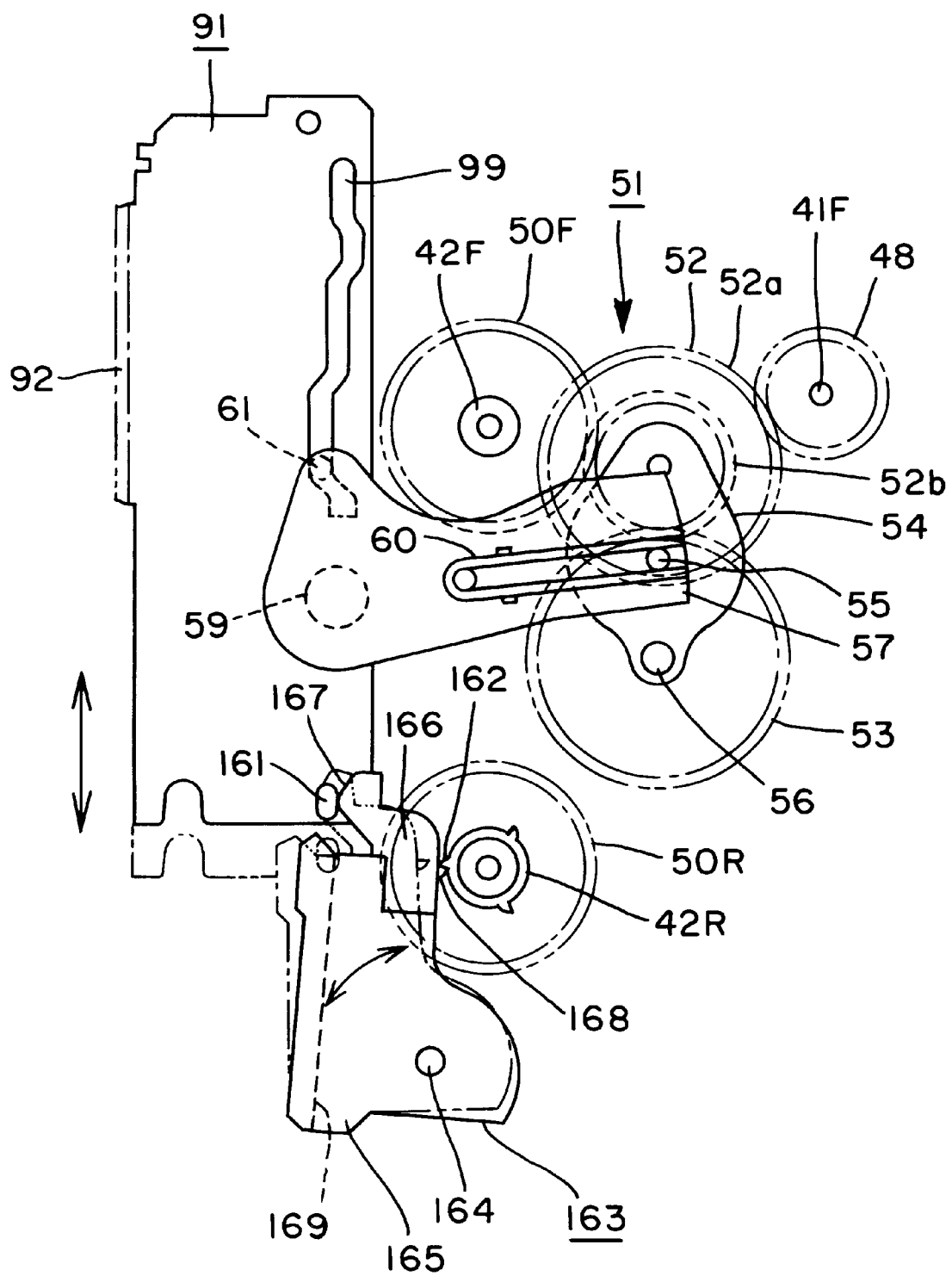
FIG. 19 is a plan view of a loading-associated mechanism of the cassette tape player according to the second embodiment of the invention.
Figure 20:
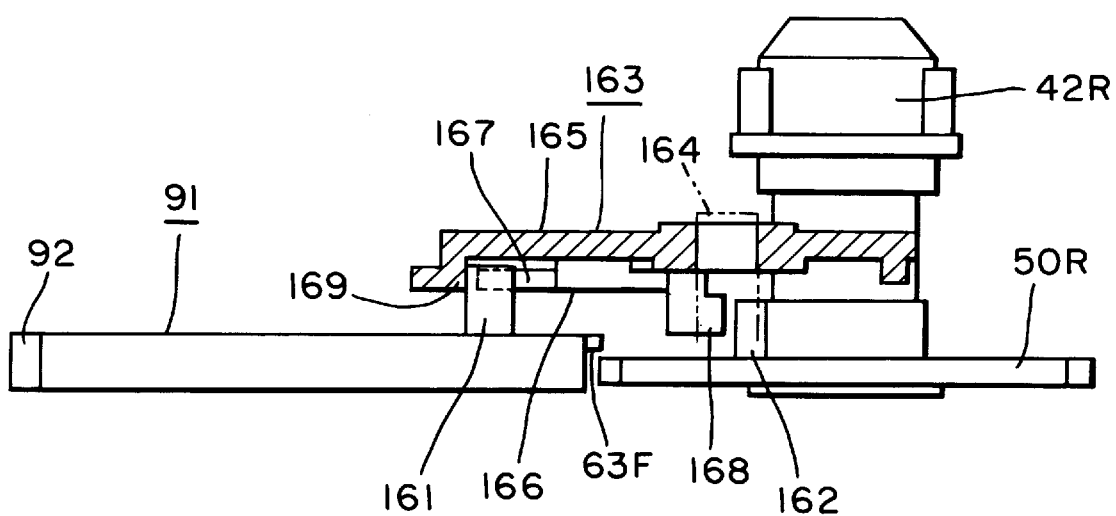
FIG. 20 is a partially cutout enlarged front view of the loading-associated mechanism of said cassette tape player.

Next, a second embodiment having a function of eliminating slack of a tape is explained hereunder, referring to FIGS. 19 and 20.

In the description hereunder, the elements similar to those of the first embodiment in their structures or functions or effects are identified with the same reference numerals, of which the explanation is omitted.

FIG. 19 is a plan view of a loading-associated mechanism of the cassette tape player, and FIG. 20 is a partially cutout enlarged front view of the loading-associated mechanism of the cassette tape player.

According to the second embodiment, the cam groove 99 of the mode changeover plate 91 has such a shape that the first rocking plate 57 rocks by means of the pin 61 toward the forward-rotation side and that the transmission gear 52 is engaged with the low-speed gear 48 and the reel gear 50F of the forward-rotation components when the mode changeover plate 91 is at the stand-by position shown in FIG. 19. A protruding portion 161 is formed on the front end of the upper surface of the mode changeover plate 91.

A plurality of protrusions 162 are formed around the lower part of the outer cylindrical wall of the spindle portion of the reel block 42 on the reverse-rotation side.

A reel block stopper 163 for stopping the reverse reel block 42R by shifting the mode changeover plate 91 to the stand-by position is disposed in front of the mode changeover plate 91 and the reverse reel block 42R. The reel block stopper 163 includes a base plate portion 165 rotatably supported by a supporting shaft portion 164, a protruding portion 166 formed on the rear area of the base plate portion 165 and protruding downward, an abutting portion 167 formed at the left end of the protruding portion 166, and a stopper portion 168 formed at the right end of the protruding portion 166. The abutting portion 167 is designed to come into contact with the right side of the protruding portion 161, and the stopper portion 168 is designed to be engaged with the protrusions 162 one at a time. A restricting edge portion 169 which is capable of catching the left side of the protruding portion 161 is formed at the left end of the underside of the base plate portion 165.

The control unit of the cassette tape player has a function that serves as a tape slack eliminating control means for rotating the forward reel block 42F by means of the main motor 47 along with the movement of the mode changeover plate 91 to the stand-by position when a cassette tape C is loaded on or ejected from the cassette loading area 2. At that time, the main motor 47 is driven either for a given length of time or until the end detecting means 151 detects that rotation has stopped.

With the configuration as above, when a cassette tape C is loaded on the cassette loading area 2, the mode changeover plate 91 moves to the stand-by position.

As a result of the movement of the mode changeover plate 91 to the stand-by position, the transmission gear 52 comes into engagement with the low-speed gear 48 and the forward reel gear 50F, and the protruding portion 161 of the mode changeover plate 91 rocks the abutting portion 167 of the reel block stopper 163 to the right so that the stopper portion 168 of the reel block stopper 163 advances to a position where it is capable of catching the protrusions 162 of the reverse reel block 42R.

In this state, the main motor 47 is actuated by the function of the tape slack eliminating control means so that the reel block 42F on the forward-rotation side takes up the tape of the cassette tape C forward. Thus, the embodiment described above prevents the tape from tangling or other similar problems by taking up the slack of the tape between the forward reel and the reverse reel of the cassette tape C.

When the mode changeover plate 91 is moved from the stand-by position to a forward-mode position or a position corresponding to any other operation mode, the protruding portion 161 moves forward to detach itself from the abutting portion 167 of the reel block stopper 163 and become engaged with the restricting edge portion 169, and the reel block stopper 163 rocks to the left so that the stopper portion 168 of the reel block stopper 163 retreats to a position where it is prevented from coming into contact with a protrusion 162 of the reverse reel block 42R. Therefore, the reverse reel block 42R is allowed to rotate when the mode changeover plate 91 has moved to any position corresponding to an operation mode other than the stand-by position.

Effect of The Invention

In the present invention, one of the capstans is provided with a low speed gear, while the other capstan is provided with a high speed gear. In association with this, the transmission changeover means serves to transmit the driving force from the low-speed gear of the one capstan to the reel gear that corresponds to the direction in which the tape is run when the system is in either the forward mode or the reverse mode, and transmit the driving force from the high-speed gear of the other capstan to the reel gear that corresponds to the direction of rotation of the tape when the system is in either the fast-forward mode or the rewinding mode. As the mechanism of transmitting the driving force to the pair of reel blocks is thus shared by the forward-rotation components and the reverse-rotation components, the device is capable of reducing the number of parts and simplifying the structure.

According to one embodiment, the transmission changeover means has transmission gears disposed between the pair of capstans and the pair of reel blocks. Therefore, the cassette tape player is capable of performing transmission changeover easily and reliably by rocking the transmission gears toward either the forward-rotation components or the reverse-rotation components, and also in the direction of either the capstans or the reel blocks.

According to another configuration, the end detecting means monitors rotation of one of the transmission gears and detects the tape end based on detection of rotation of said transmission gear coming to a stop. Therefore, as there is no need of providing each reel block with an end detecting means or installing a separate detecting means dedicated for each respective reel block, the cassette tape player is capable of reducing the number of parts and simplifying the structure.

According to another configuration of a cassette tape player, a low-speed clutch is installed between one of the fly wheels and the low-speed gear, while a high-speed clutch is installed between the other fly wheel and the high-speed gear. Therefore, while having the same effect as that of a cassette tape player according to any one of the above configurations, the cassette tape player has another benefit in that it is easy to set respective torques appropriate for a low speed and a high speed.

As any mode can be selected and performed from among the forward mode, the reverse mode, the rewinding mode and the fast-forward mode by shifting a single unit of a mode changeover plate, the cassette tape player is capable of reducing the number of parts and simplifying the structure, while having the same effect as that of a cassette tape player according to any one of the above described configuration.

As the head can be moved toward or away from a cassette tape player by shifting a single unit of a mode changeover plate according to each respective mode, the cassette tape player is capable of reducing the number of parts and simplifying the structure, while having the same effect as that of the above described configuration.

As the pinch roller can be brought into contact with or separated from the capstans by shifting a single unit of a mode changeover plate according to each respective mode, a cassette tape player is capable of reducing the number of parts and simplifying the structure, while having the same effect as that of the above-described configurations.

According to another configuration of a cassette, the loading mechanism performs the loading function and the ejecting function by means of the loading rack that is adapted to be engaged with the drive gear; the mode changeover plate can be shifted by means of the mode changeover rack that is adapted to be engaged with the drive gear; and the loading mechanism and the mode changeover plate are designed to be driven by a common sub motor that drives the drive gear. Therefore, while having the same effect as that of any one of the above described configurations, a cassette tape player according to another configuration is capable of reducing the number of parts and simplifying the structure. Furthermore, the interlocking timing adjusting means permits either the loading rack or the mode changeover rack to be locked at a position separated from the drive gear when the other becomes engaged with the drive gear. The interlocking timing adjusting means also brings the mode changeover rack into engagement with the drive gear when the loading rack becomes disengaged from the drive gear during a loading operation, and brings the loading rack into engagement with the drive gear when the mode changeover rack becomes disengaged from the drive gear during an ejecting operation. Thus, reliable engagement of the loading rack with the drive gear as well as reliable engagement of or the mode changeover rack with the drive gear are ensured.

While having the same effect as that of any one of above described configurations of the cassette tape player is capable of taking up a slack of the tape and thereby preventing the tape from tangling or other similar problems by stopping one of the reel blocks with the reel block stopper and rotating the other reel block through control by the tape slack eliminating control means when the mode changeover plate is shifted to the stand-by position.

What is claimed is:

1. A reel drive mechanism for a cassette tape player comprising:
   a pair of capstans, said pair of capstans providing for a respective forward rotation and a respective reverse rotation;
   a driving means for driving said pair of capstans in said respective forward rotation and said respective reverse rotation;
   a pair of reel blocks, said pair of reel blocks providing for said respective forward rotation and said respective reverse rotation;
   a pair of reel gears, said pair of reel gears being integrally rotated with said pair of reel blocks;
   a low-speed gear being integrally rotated and coaxial with one of said pair of capstans;
   a high-speed gear being integrally rotated and coaxial with the other of said pair of capstans; and
   a transmission changeover means for transmitting a driving force from said low-speed gear to one of said pair of reel gears corresponding to a direction in which a cassette tape is desired to run when said driving means is in either a forward mode position or a reverse mode position, said transmission changeover means for transmitting a driving force from said high-speed gear to the other of said pair of reel gears corresponding to a direction in which said cassette tape is fed when said driving means is in either a fast-forward mode position or a rewinding mode position.

2. The reel drive mechanism as claimed in claim 1, wherein said transmission changeover means being disposed between said pair of capstans and said pair of reel blocks, said transmission changeover means including a pair of interlocked transmission gears, a gear supporting plate, said gear supporting plate supporting said pair of interlocked transmission gears and permitting said pair of interlocked transmission gears to rotate, a first rocking plate for rocking said gear supporting plate in a direction of one of said pair of capstans and one of said pair of reel blocks providing said respective forward rotation or in a direction of the other of said pair of capstans and the other of said pair of reel blocks providing said respective reverse rotation, and a second rocking plate for rocking said gear supporting plate back and forth between said pair of capstans and said pair of reel blocks.

3. The reel drive mechanism as claimed in claim 1, wherein said reel drive mechanism further comprises:
   an end detecting means, said end detecting means providing a rotation detection sensor, said rotation detection sensor detecting rotation of one of said pair of interlocked transmission gears, and said rotation detection sensor being adapted to detect an end of said cassette tape by detecting said rotation of said one of said pair of interlocked transmission gears coming to a stop.

4. The reel drive mechanism as claimed in claim 1, wherein said reel drive mechanism further comprises:
   a pair of fly wheels being respectively rotated together with said pair of capstans;
   a low-speed clutch being installed between one of said pair of fly wheels and said low-speed gear, said low-speed clutch transmitting a torque from said one of said pair of fly wheels to said low-speed gear, said low-speed clutch stopping transmitting when said torque exceeds a given level; and
   a high-speed clutch being installed between the other of said pair of fly wheels and said high-speed gear, said high-speed clutch transmitting a torque from said other of said pair of fly wheels to said high-speed gear, said high-speed clutch stopping transmitting when said torque exceeds a given level.

5. The reel drive mechanism as claimed in claim 2, wherein said reel drive mechanism further comprises:
   a pair of fly wheels being respectively rotated together with said pair of capstans;
   a low-speed clutch being installed between one of said pair of fly wheels and said low-speed gear, said low-speed clutch transmitting a torque from said one of said pair of fly wheels to said low-speed gear, said low-speed clutch stopping transmitting when said torque exceeds a given level; and
   a high-speed clutch being installed between the other of said pair of fly wheels and said high-speed gear, said high-speed clutch transmitting a torque from said other of said pair of fly wheels to said high-speed gear, said high-speed clutch stopping transmitting when said torque exceeds a given level.

6. The reel drive mechanism as claimed in claim 3, wherein said reel drive mechanism further comprises:
   a pair of fly wheels being respectively rotated together with said pair of capstans;
   a low-speed clutch being installed between one of said pair of fly wheels and said low-speed gear, said low-speed clutch transmitting a torque from said one of said pair of fly wheels to said low-speed gear, said low-speed gear stopping transmitting when said torque exceeds a given level; and
   a high-speed clutch being installed between the other of said pair of fly wheels and said high-speed gear, said high-speed clutch transmitting a torque from said other of said pair of fly wheels to said high-speed gear, said high-speed clutch stopping transmitting when said torque exceeds a given level.

7. The reel drive mechanism as claimed in claim 1, wherein said reel drive mechanism further comprising:

a mode changeover plate, said mode changeover plate enabling control of a transmission changeover function of said transmission changeover means, said transmission changeover function shifting to any one of a position selected from said forward mode position permitting said driving force being transmitted from said low-speed gear to a forward reel gear of said pair of reel gears, said reverse mode position permitting said driving force being transmitted from said low-speed gear to a reverse reel gear of said pair of reel gears, said fast-forward mode position permitting said driving force being transmitted from said high-speed gear to said forward reel gear and said rewinding mode position permitting said driving force being transmitted from said high-speed gear to said reverse reel gear.

8. The reel drive mechanism as claimed in claim 2, wherein said reel drive mechanism further comprising:

a mode changeover plate, said mode changeover plate enabling control of a transmission changeover function of said transmission changeover means, said transmission changeover function shifting to any one of a position selected from said forward mode position permitting said driving force being transmitted from said low-speed gear to a forward reel gear of said pair of reel gears, said reverse mode position permitting said driving force being transmitted from said low-speed gear to a reverse reel gear of said pair of reel gears, said fast-forward mode position permitting said driving force being transmitted from said high-speed gear to said forward reel gear and said rewinding mode position permitting said driving force being transmitted from said high-speed gear to said reverse reel gear.

9. The reel drive mechanism as claimed in claim 3, wherein said reel drive mechanism further comprising:

a mode changeover plate, said mode changeover plate enabling control of a transmission changeover function of said transmission changeover means, said transmission changeover function shifting to any one of a position selected from said forward mode position permitting said driving force being transmitted from said low-speed gear to a forward reel gear of said pair of reel gears, said reverse mode position permitting said driving force being transmitted from said low-speed gear to a reverse reel gear of said pair of reel gears, said fast-forward mode position permitting said driving force being transmitted from said high-speed gear to said forward reel gear and said rewinding mode position permitting said driving force being transmitted from said high-speed gear to said reverse reel gear.

10. The reel drive mechanism as claimed in claim 4, wherein said reel drive mechanism further comprising:

a mode changeover plate, said mode changeover plate enabling control of a transmission changeover function of said transmission changeover means, said transmission changeover function shifting to any one of a position selected from said forward mode position permitting said driving force being transmitted from said low-speed gear to a forward reel gear of said pair of reel gears, said reverse mode position permitting said driving force being transmitted from said low-speed gear to a reverse reel gear of said pair of reel gears, said fast-forward mode position permitting said driving force being transmitted from said high-speed gear to said forward reel gear and said rewinding mode position permitting said driving force being transmitted from said high-speed gear to said reverse reel gear.

11. The reel drive mechanism as claimed in claim 7, wherein said reel drive mechanism further comprising:

a head plate, said head plate supporting a head and moving said head toward said cassette tape upon shifting of said mode changeover plate to said forward mode position or said reverse mode position, and moving said head away from said cassette tape upon shifting of said mode changeover plate to said fast-forward mode position or said rewinding mode position.

12. The reel drive mechanism as claimed in claim 8, wherein said reel drive mechanism further comprising:

a head plate, said head plate supporting a head and moving said head toward said cassette tape upon shifting of said mode changeover plate to said forward mode position or said reverse mode position, and moving said head away from said cassette tape upon shifting of said mode changeover plate to said fast-forward mode position or said rewinding mode position.

13. The reel drive mechanism as claimed in claim 9, wherein said reel drive mechanism further comprising:

a head plate, said head plate supporting a head and moving said head toward said cassette tape upon shifting of said mode changeover plate to said forward mode position or said reverse mode position, and moving said head away from said cassette tape upon shifting of said mode changeover plate to said fast-forward mode position or said rewinding mode position.

14. The reel drive mechanism as claimed in claim 10, wherein said reel drive mechanism further comprising:

a head plate, said head plate supporting a head and moving said head toward said cassette tape upon shifting of said mode changeover plate to said forward mode position or said reverse mode position, and moving said head away from said cassette tape upon shifting of said mode changeover plate to said fast-forward mode position or said rewinding mode position.

15. The reel drive mechanism as claimed in claim 7, wherein said reel drive mechanism further comprising:

a pair of pinch rollers for being brought into contact with and separated from said pair of capstans; and a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

16. The reel drive mechanism as claimed in claim 8, wherein said reel drive mechanism further comprising:

a pair of pinch rollers for being brought into contact with and separated from said pair of capstans; and a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

17. The reel drive mechanism as claimed in claim 9, wherein said reel drive mechanism further comprising:
   a pair of pinch rollers for being brought into contact with and separated from said pair of capstans; and
   a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

18. The reel drive mechanism as claimed in claim 10, wherein said reel drive mechanism further comprising:
   a pair of pinch rollers for being brought into contact with and separated from said pair of capstans; and
   a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

19. The reel drive mechanism as claimed in claim 11, wherein said reel drive mechanism further comprising:
   a pair of pinch rollers for being brought into contact with and separated from said pair of capstans; and
   a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

20. The reel drive mechanism as claimed in claim 12, wherein said reel drive mechanism further comprising:
   a pair of pinch rollers for being brought into contact with and separated from said pair of capstans; and
   a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

21. The reel drive mechanism as claimed in claim 13, wherein said reel drive mechanism further comprising:
   a pair of pinch rollers for being brought into contact with and separated from said pair of capstans; and
   a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

22. The reel drive mechanism as claimed in claim 14, wherein said reel drive mechanism further comprising:
   a pair of pinch rollers for being brought into contact with and separated from said pair of capstans; and
   a pinch roller changeover means for moving a forward pinch roller of said pair of pinch rollers toward a corresponding capstan upon shifting of said mode changeover plate to said forward mode position, said pinch roller changeover means for moving a reverse pinch roller of said pair of pinch rollers toward a corresponding capstan upon shifting of said mode changeover plate to said reverse mode position, and said pinch roller changeover means for moving said forward pinch roller and said reverse pinch roller away from said capstans upon shifting of said mode changeover plate to said fast-forward mode position or said rewinding mode position.

23. The reel drive mechanism as claimed in claim 7, wherein said reel drive mechanism further comprising:
   a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
   a drive gear, said drive gear rotating when said loading mechanism performs said loading function or said ejecting function, said loading rack engaging said drive gear enabling said loading mechanism to perform said loading function or said ejecting function;
   a mode changeover rack being part of said mode changeover plate, said mode changeover rack moving in parallel with said loading rack and engaged with said drive gear enabling shifting of said mode changeover plate; and
   an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

24. The reel drive mechanism as claimed in claim 8, wherein said reel drive mechanism further comprising:
   a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
   a drive gear, said drive gear rotating when said loading mechanism performs said loading function or said ejecting function, said loading rack engaging said drive gear enabling said loading mechanism to perform said loading function or said ejecting function;
   a mode changeover rack being part of said mode changeover plate, said mode changeover rack moving in parallel with said loading rack and engaged with said drive gear enabling shifting of said mode changeover plate; and
   an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

25. The reel drive mechanism as claimed in claim 9, wherein said reel drive mechanism further comprising:
   a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
   a drive gear, said drive gear rotating when said loading mechanism performs said loading function or said ejecting function, said loading rack engaging said drive gear enabling said loading mechanism to perform said loading function or said ejecting function;
   a mode changeover rack being part of said mode changeover plate, said mode changeover rack moving in parallel with said loading rack and engaged with said drive gear enabling shifting of said mode changeover plate; and
   an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

26. The reel drive mechanism as claimed in claim 10, wherein said reel drive mechanism further comprising:
   a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
   a drive gear, said drive gear rotating when said loading mechanism performs said loading function or said ejecting function, said loading rack engaging said drive gear enabling said loading mechanism to perform said loading function or said ejecting function;
   a mode changeover rack being part of said mode changeover plate, said mode changeover rack moving in parallel with said loading rack and engaged with said drive gear enabling shifting of said mode changeover plate; and
   an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

27. The reel drive mechanism as claimed in claim 11, wherein said reel drive mechanism further comprising:
   a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
   a drive gear, said drive gear rotating when said loading mechanism performs said loading function or said ejecting function, said loading rack engaging said drive gear enabling said loading mechanism to perform said loading function or said ejecting function;
   a mode changeover rack being part of said mode changeover plate, said mode changeover rack moving in parallel with said loading rack and engaged with said drive gear enabling shifting of said mode changeover plate; and
   an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

28. The reel drive mechanism as claimed in claim 12, wherein said reel drive mechanism further comprising:
- a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
- a drive gear, said drive gear rotating when said loading mechanism performs said loading function or said ejecting function, said loading rack engaging said drive gear enabling said loading mechanism to perform said loading function or said ejecting function;
- a mode changeover rack being part of said mode changeover plate, said mode changeover rack moving in parallel with said loading rack and engaged with said drive gear enabling shifting of said mode changeover plate; and
- an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

29. The reel drive mechanism as claimed in claim 13, wherein said reel drive mechanism further comprising:
- a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
- a drive gear, said drive gear rotating when said loading mechanism performs said loading function or said ejecting function, said loading rack engaging said drive gear enabling said loading mechanism to perform said loading function or said ejecting function;
- a mode changeover rack being part of said mode changeover plate, said mode changeover rack moving in parallel with said loading rack and engaged with said drive gear enabling shifting of said mode changeover plate; and
- an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

30. The reel drive mechanism as claimed in claim 14, wherein said reel drive mechanism further comprising:
- a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
- a drive gear, said drive gear rotating when said loading mechanism performs said loading function or said ejecting function, said loading rack engaging said drive gear enabling said loading mechanism to perform said loading function or said ejecting function;
- a mode changeover rack being part of said mode changeover plate, said mode changeover rack moving in parallel with said loading rack and engaged with said drive gear enabling shifting of said mode changeover plate; and
- an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

31. The reel drive mechanism as claimed in claim 15, wherein said reel drive mechanism further comprising:
- a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;
- a drive gear, said drive gear rotating when said loading mechanism performs said loading function or said ejecting function, said loading rack engaging said drive gear enabling said loading mechanism to perform said loading function or said ejecting function;
- a mode changeover rack being part of said mode changeover plate, said mode changeover rack moving in parallel with said loading rack and engaged with said drive gear enabling shifting of said mode changeover plate; and
- an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

32. The reel drive mechanism as claimed in claim 16, wherein said reel drive mechanism further comprising:
- a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

33. The reel drive mechanism as claimed in claim 17, wherein said reel drive mechanism further comprising:

a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

34. The reel drive mechanism as claimed in claim 18, wherein said reel drive mechanism further comprising:

a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

35. The reel drive mechanism as claimed in claim 19, wherein said reel drive mechanism further comprising:

a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

36. The reel drive mechanism as claimed in claim 20, wherein said reel drive mechanism further comprising:

a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

37. The reel drive mechanism as claimed in claim 21, wherein said reel drive mechanism further comprising:

a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

38. The reel drive mechanism as claimed in claim 22, wherein said reel drive mechanism further comprising:

a loading mechanism, said loading mechanism having a loading rack, said loading mechanism performing a loading function, said loading function loading said cassette tape on a given cassette loading area or said loading mechanism performing an ejecting function, said ejecting function ejecting said cassette tape from said given cassette loading area;

a drive gear, said drive gear rotating when said loading mechanism performs said loading function or said ejecting function, said loading rack engaging said drive gear enabling said loading mechanism to perform said loading function or said ejecting function;

a mode changeover rack being part of said mode changeover plate, said mode changeover rack moving in parallel with said loading rack and engaged with said drive gear enabling shifting of said mode changeover plate; and an interlocking timing adjusting means, said interlocking timing adjusting means locking said loading rack or said mode changeover rack at a position separated from said drive gear when said loading rack or said mode changeover rack engages said drive gear, said interlocking timing adjusting means engaging said mode changeover rack with said drive gear when said loading rack disengages from said drive gear during a loading operation, and said interlocking timing adjusting means engaging said loading rack with said drive gear when said mode changeover rack disengages from said drive gear during an ejecting operation.

39. The reel drive mechanism as claimed in any one of claims 7–38, wherein said transmission changeover function further shifting to a stand-by position permitting said driving force being transmitted from said low-speed gear a reel gear of said pair of reel gears associated with said one of said pair of reel blocks and said reel drive mechanism further comprising:

a reel block stopper for stopping the other of said pair of reel blocks upon shifting of said mode changeover plate to said stand-by position; and a tape slack eliminating control means for rotating said one reel block of said pair of reel blocks by means of said driving means when said mode changeover plate being shifted to said stand-by position.

* * * * *

UNITED STATES PATENT AND TRADEMARK OFFICE
CERTIFICATE OF CORRECTION

PATENT NO. : 6,204,993 B1  Page 1 of 1
DATED : March 20, 2001
INVENTOR(S) : Tadahiro Ikuta It is certified that error appears in the above-identified patent and that said Letters Patent is hereby corrected as shown below:

Title page,
Item [76] Inventor, replace "Nasa-gun" with -- Nasu-gun --.

Item [56],
Attorney, Agent or Firm insert -- Dennis G. LaPointe, Louise A. Foutch, Mason & Assoc., P.A.

Signed and Sealed this

Thirteenth Day of November, 2001

Attest:

*Attesting Officer*

NICHOLAS P. GODICI
*Acting Director of the United States Patent and Trademark Office*